US012807102B2

(12) United States Patent
Witt et al.

(10) Patent No.: US 12,807,102 B2
(45) Date of Patent: Nov. 24, 2026

(54) BRAKE PEDAL POSITION SENSING UNIT AND FEEDBACK SYSTEM

(71) Applicant: Deere & Company, Moline, IL (US)

(72) Inventors: Ross Witt, West Des Moines, IA (US); Jeff Lubben, Hudson, IA (US); Pradip Shinde, Pune (IN); Lowell D. Stutzman, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 767 days.

(21) Appl. No.: 18/079,550

(22) Filed: Dec. 12, 2022

(65) Prior Publication Data

US 2023/0266114 A1 Aug. 24, 2023

Related U.S. Application Data

(60) Provisional application No. 63/334,723, filed on Apr. 26, 2022, provisional application No. 63/259,909, filed on Feb. 24, 2022.

(51) Int. Cl.
*B60T 7/04* (2006.01)
*B60K 35/28* (2024.01)

(52) U.S. Cl.
CPC .............. *B60T 7/042* (2013.01); *B60K 35/28* (2024.01); *B60K 2360/162* (2024.01)

(58) Field of Classification Search
CPC ...... B60T 7/042; B60K 35/28; B60K 2360/12
See application file for complete search history.

(56) References Cited

U.S. PATENT DOCUMENTS 2,065,459 A 12/1936 Jenkins
4,205,734 A 6/1980 Ostrowski
(Continued)

FOREIGN PATENT DOCUMENTS

CA 2128301 A1 3/1995
CN 104760580 A 7/2015
(Continued)

OTHER PUBLICATIONS

German Search Report issued in application No. DE102023100988.5, dated Jan. 19, 2024, 14 pages.
(Continued)

*Primary Examiner* — Minnah L Seoh
*Assistant Examiner* — Gregory T Prather
(74) *Attorney, Agent, or Firm* — Gary L. Montle; Lucian Wayne Beavers; Patterson Intellectual Property Law, PC

(57) ABSTRACT

A non-contact brake pedal position sensing system is provided with components for each of first and second brake pedal units configured for angular displacement about a rotation axis at respective first ends thereof, responsive to manual engagement at respective second ends thereof. The components include a sensor cam located at the first end of each respective brake pedal unit and configured for angular displacement along therewith, a sensor housing mounted at a fixed position with respect to the rotation axis, and a sensor mounted within the sensor housing and configured to generate output signals corresponding to a sensed air gap between the sensor and the sensor cam, wherein the sensed air gap between the sensor cam and the sensor corresponds to an amount of angular displacement for the respective brake pedal unit. The sensor housing may preferably be oriented orthogonally with respect to the rotation axis.

18 Claims, 27 Drawing Sheets

(56) References Cited

U.S. PATENT DOCUMENTS

| | | | | |
|---|---|---|---|---|
| 4,441,596 | A | 4/1984 | Nakahara et al. | |
| 6,323,641 | B1 | 11/2001 | Allwine | |
| 6,433,536 | B1 | 8/2002 | Yundt et al. | |
| 6,446,005 | B1 * | 9/2002 | Bingeman | G05D 1/027 701/472 |
| 6,655,756 | B2 | 12/2003 | Riddiford et al. | |
| 6,997,281 | B2 | 2/2006 | Chernoff et al. | |
| 7,517,026 | B1 | 4/2009 | Herbst et al. | |
| 7,539,571 | B2 | 5/2009 | Strosser et al. | |
| 7,857,400 | B2 | 12/2010 | Weiberle et al. | |
| 8,827,048 | B2 | 9/2014 | Mazzucchi et al. | |
| 9,205,818 | B2 | 12/2015 | Széll et al. | |
| 9,260,088 | B2 | 2/2016 | Shand et al. | |
| 9,447,832 | B2 | 9/2016 | Todd et al. | |
| 9,605,724 | B2 | 3/2017 | Okuma | |
| 10,112,587 | B2 | 10/2018 | Richards et al. | |
| 10,501,011 | B2 * | 12/2019 | Ding | B60T 17/22 |
| 10,576,887 | B2 | 3/2020 | Wolf-Monheim | |
| 10,899,330 | B2 | 1/2021 | Schmitz et al. | |
| 11,215,252 | B2 | 1/2022 | Ruiz et al. | |
| 2003/0188600 | A1 * | 10/2003 | Slanec | B60T 7/042 74/514 |
| 2004/0017190 | A1 * | 1/2004 | McDearmon | G01D 5/147 324/207.2 |
| 2004/0251095 | A1 | 12/2004 | Simard et al. | |
| 2007/0209471 | A1 | 9/2007 | Nunez | |
| 2007/0284160 | A1 | 12/2007 | Loring et al. | |
| 2008/0091319 | A1 | 4/2008 | Schick et al. | |
| 2009/0001805 | A1 | 1/2009 | Schick et al. | |
| 2010/0201191 | A1 | 8/2010 | Schick et al. | |
| 2013/0233118 | A1 | 9/2013 | Khan et al. | |
| 2014/0176130 | A1 | 6/2014 | Bueno Palacios | |
| 2017/0122779 | A1 | 5/2017 | Krishna et al. | |
| 2020/0001711 | A1 | 1/2020 | Burke et al. | |
| 2020/0001838 | A1 | 1/2020 | Hurd et al. | |
| 2021/0078579 | A1 | 3/2021 | Negri et al. | |
| 2021/0094519 | A1 | 4/2021 | Patoglu | |
| 2023/0054790 | A1 * | 2/2023 | Seol | B60T 11/18 |

FOREIGN PATENT DOCUMENTS

| | | | |
|---|---|---|---|
| CN | 108528422 | A | 9/2018 |
| DE | 1246428 | B | 8/1967 |
| DE | 19902128 | A1 | 11/1999 |
| DE | 19958241 | A1 | 8/2001 |
| DE | 10012179 | A1 | 10/2001 |
| DE | 10052442 | A1 | 5/2002 |
| DE | 10232212 | A1 | 1/2004 |
| DE | 102020105675 | A1 | 10/2020 |
| EP | 1409962 | A2 | 4/2004 |
| EP | 3220105 | A1 | 9/2017 |
| EP | 3614107 | A1 | 2/2020 |
| JP | 2003-226165 | A | 8/2003 |
| JP | 2004268748 | A | 9/2004 |
| JP | 2013141833 | A | 7/2013 |
| JP | 2016-215754 | A | 12/2016 |
| WO | 242713 | A2 | 5/2002 |

OTHER PUBLICATIONS

German Search Report issued in application No. 102023100942.7, dated Sep. 14, 2023, 6 pages.

* cited by examiner

BRAKE PEDAL POSITION SENSING UNIT AND FEEDBACK SYSTEM

FIELD OF THE DISCLOSURE

The present disclosure relates to a brake pedal sensing unit and feedback system for a work vehicle.

BACKGROUND

Work vehicles include a braking system activated by one or more brake pedals. Work vehicles can include a brake-by-wire system activated by one or more brake pedals without the mechanical link between the brake pedals and the braking system. Work vehicles can include separate brake pedals to operate the left and right brakes. Rotary (angular) position sensing systems are conventionally provided to monitor respective positions of the separate brake pedals, but such conventional systems are typically subject to sensor wear, limited resolution/accuracy, and/or undesirably high costs due to the presence of moving components or interfaces.

BRIEF SUMMARY OF THE DISCLOSURE

The current disclosure provides an enhancement to conventional rotary (angular) position sensing systems in the context of braking units, at least in part by utilizing a completely non-contact interface between a sensor and a target which rotates along with the brake pedal, thereby substantially eliminating sensor wear while further providing a high resolution and accuracy.

Embodiments of a brake pedal position sensing system as disclosed herein may further benefit from a reduction of mechanical tolerance influences, ease of manufacture and assembly, and ease of sensor reuse into other linear and rotary position sensing systems.

According to a first embodiment, a non-contact brake pedal position sensing system as disclosed herein is provided with components corresponding to each of a first brake pedal unit and a second brake pedal unit configured for angular displacement about a rotation axis at respective first ends thereof, responsive to manual engagement at respective second ends thereof. The components include a sensor cam located at the first end of the respective brake pedal unit and configured for angular displacement along therewith, a sensor housing mounted at a fixed position with respect to the rotation axis, and a sensor mounted within the sensor housing and configured to generate output signals corresponding to a sensed air gap between the sensor and the sensor cam, wherein the sensed air gap between the sensor cam and the sensor corresponds to an amount of angular displacement for the respective brake pedal unit.

In a second embodiment, one exemplary aspect according to the above-referenced first embodiment may include that the sensor housing is oriented orthogonally with respect to the rotation axis.

In a third embodiment, one exemplary aspect according to either or both of the above-referenced first or second embodiments may include, for each of the first brake pedal unit and the second brake pedal unit, a magnet coupled to the respective sensor cam, wherein the respective sensor is configured to detect variations in a magnetic field produced by the magnet with manual engagement of the respective brake pedal unit.

In a fourth embodiment, one exemplary aspect according to any one or more of the above-referenced first to third embodiments may include that the sensor comprises a back-biased Hall effect sensor.

In a fifth embodiment, one exemplary aspect according to any one or more of the above-referenced first to fourth embodiments may include a bracket assembly holding the sensor in a fixed position relative to a shaft about which the brake pedal units rotate. The bracket assembly may include a first elongate support member coupled on a first end to the shaft and a second elongate support member coupled to a second end of the first support member. The second support member may extend parallel to the shaft, wherein the respective sensor housings are mounted along a length of the second support member.

In a sixth embodiment, one exemplary aspect according to any one or more of the above-referenced first to fifth embodiments may include a controller functionally linked to receive the output signals from each respective sensor, and further configured to generate braking command signals to a braking unit based on the received output signals.

In a seventh embodiment, one exemplary aspect according to any one or more of the above-referenced first to sixth embodiments may include a display unit configured to display information corresponding to an amount of angular displacement for the respective brake pedal unit, based on the output signals from the sensor.

In an eighth embodiment, a work vehicle as disclosed herein comprises a frame supported by one or more ground engaging apparatus, one or more power sources configured to drive an advance speed for the work vehicle, responsive at least in part to control signals from a braking unit, a first brake pedal unit and a second brake pedal unit configured for angular displacement about a rotation axis at respective first ends thereof, responsive to manual engagement at respective second ends thereof, and a non-contact brake pedal position sensing system according to any one or more of the above-referenced first to seventh embodiments.

Numerous objects, features and advantages of the embodiments set forth herein will be readily apparent to those skilled in the art upon reading of the following disclosure when taken in conjunction with the accompanying drawings.

DETAILED DESCRIPTION

The implementations disclosed in the above drawings and the following detailed description are not intended to be exhaustive or to limit the present disclosure to these implementations.

Figure 1:
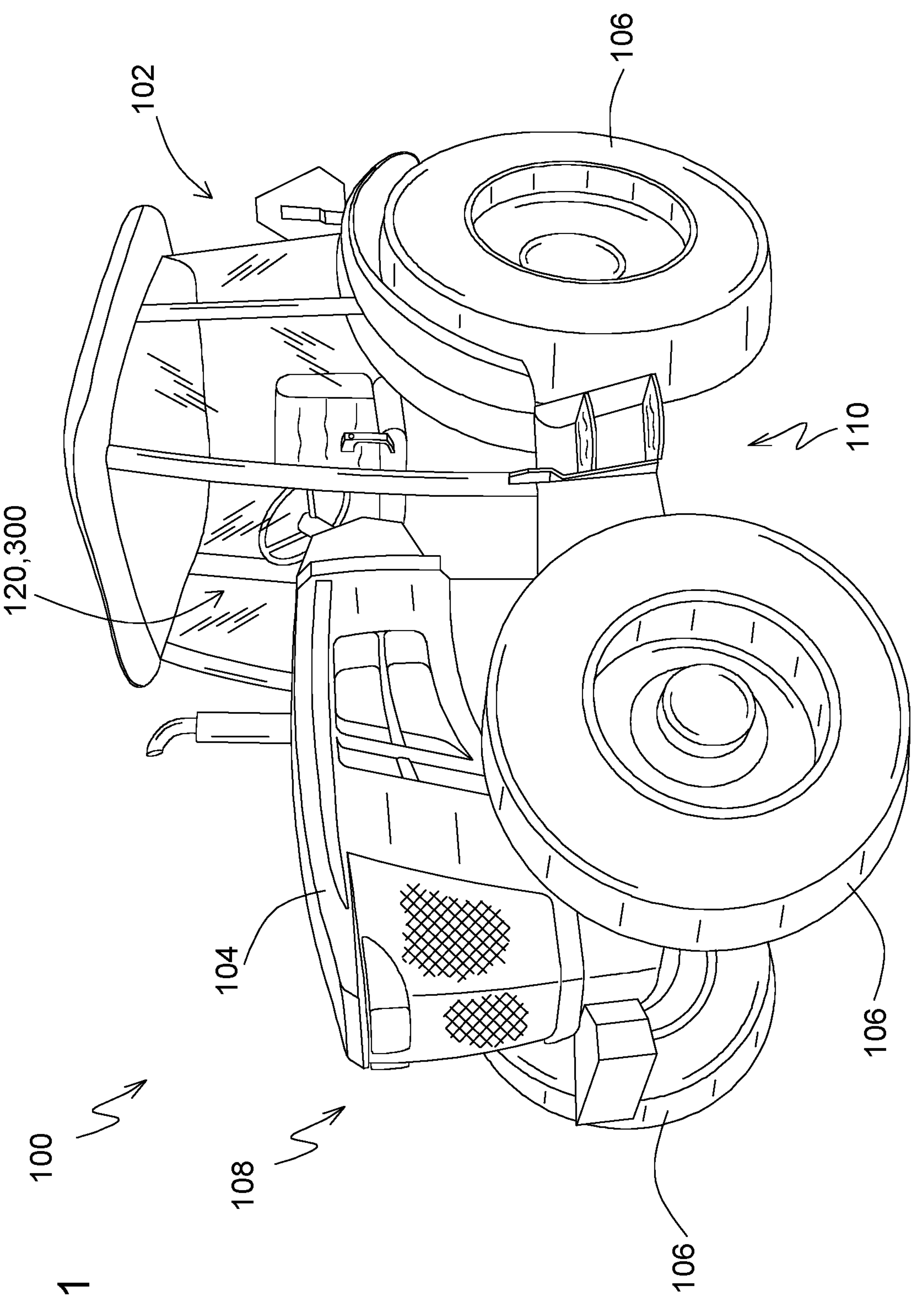
FIG. 1 is a perspective view representing an embodiment of a work vehicle including a brake pedal position sensing and feedback system as disclosed herein.
Figure 2:
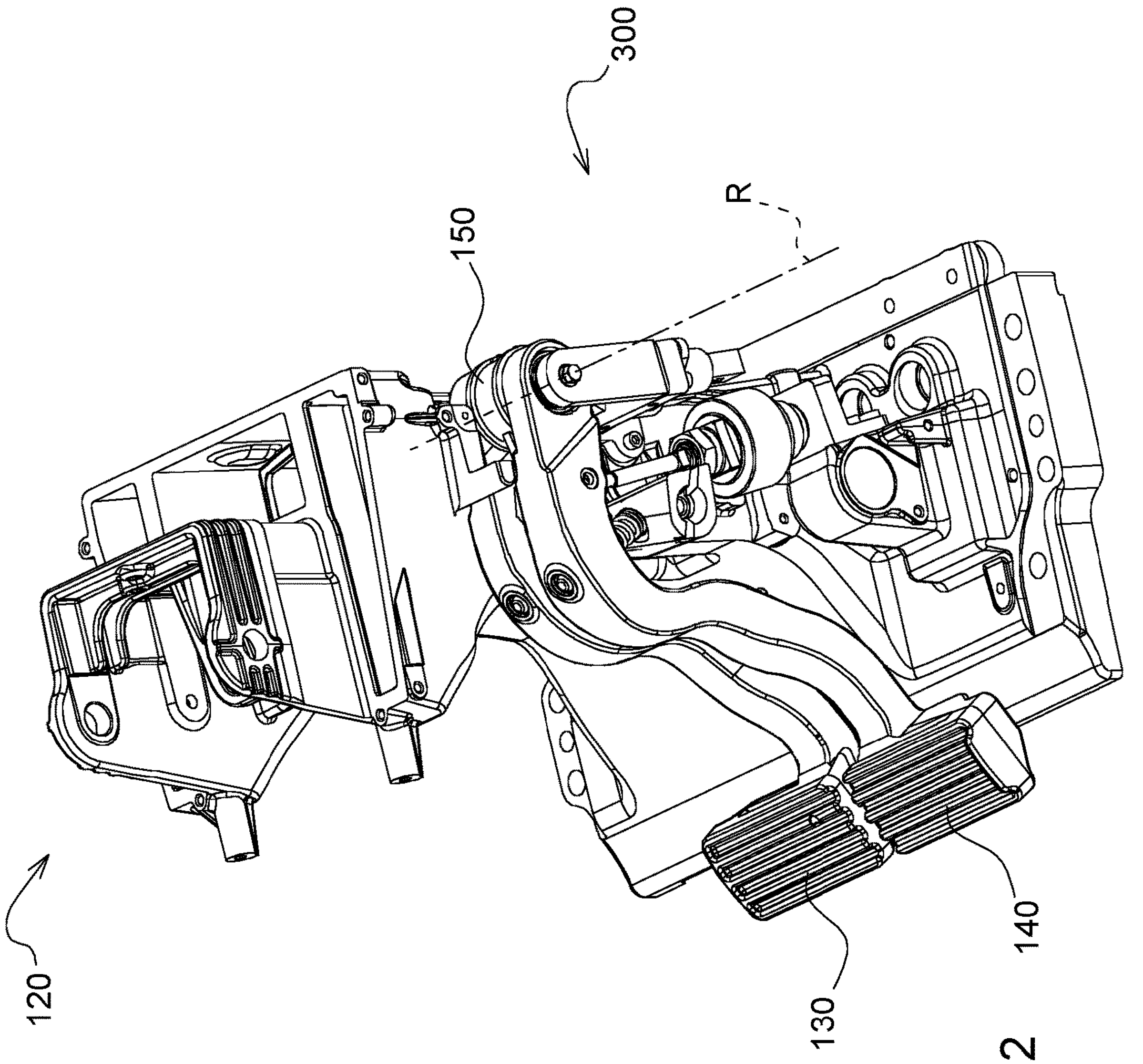
FIG. 2 is a perspective view representing a brake pedal position sensing and feedback system as disclosed herein.
Figure 3:
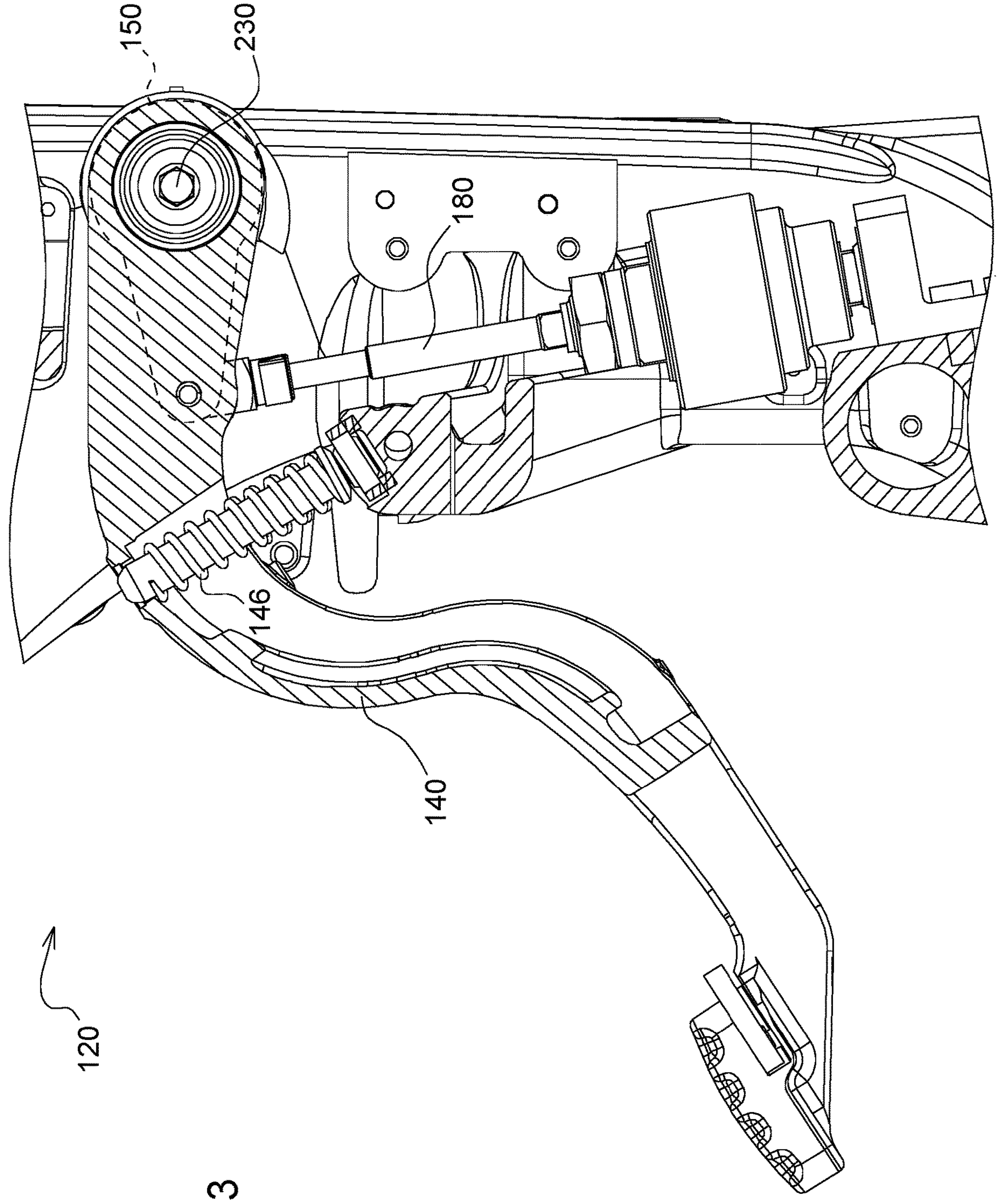
FIG. 3 is a right sectional view representing an embodiment of a brake pedal feedback system as disclosed herein.
Figure 4:
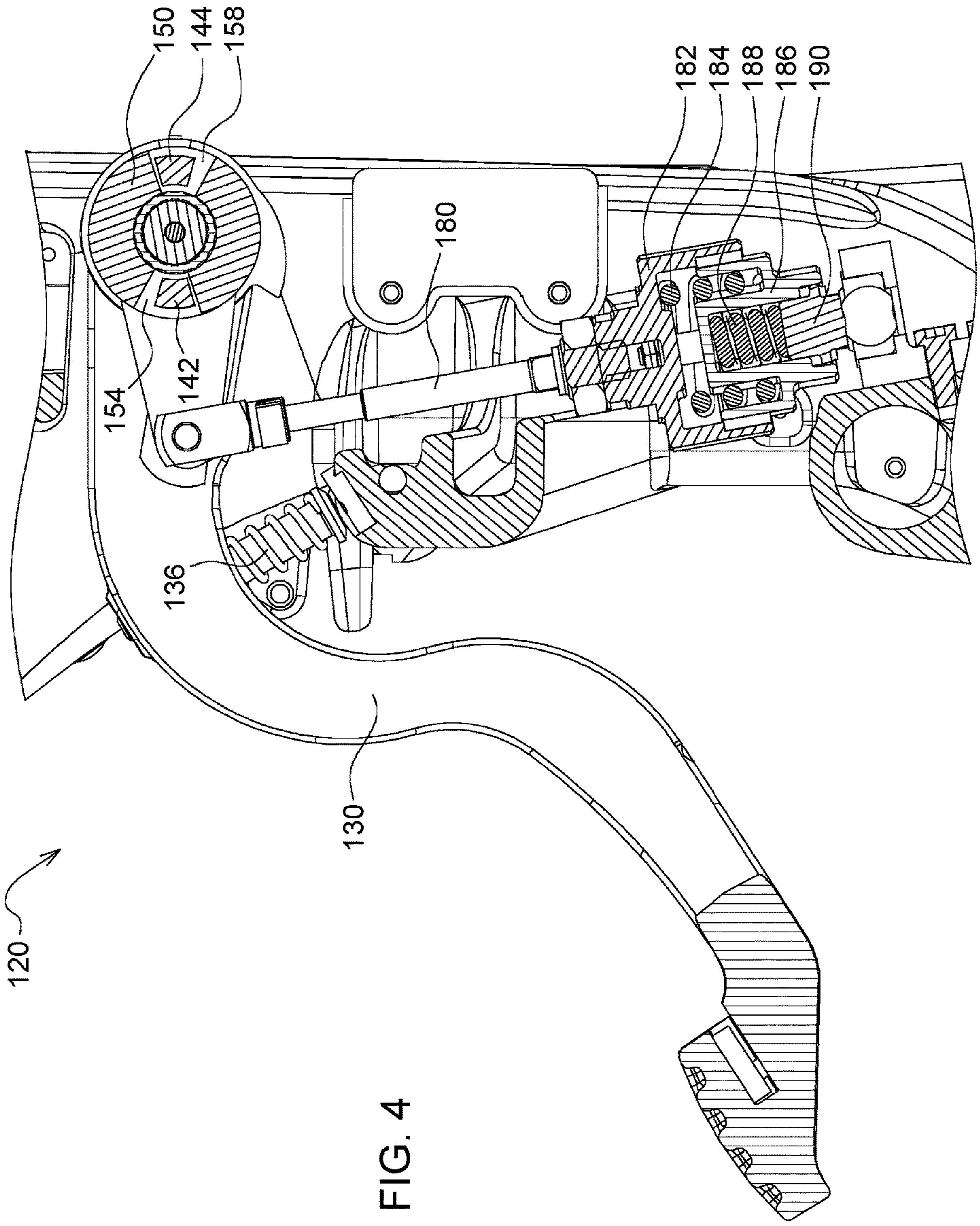
FIG. 4 is a right sectional view representing an embodiment of a brake pedal feedback system as disclosed herein.
Figure 5:
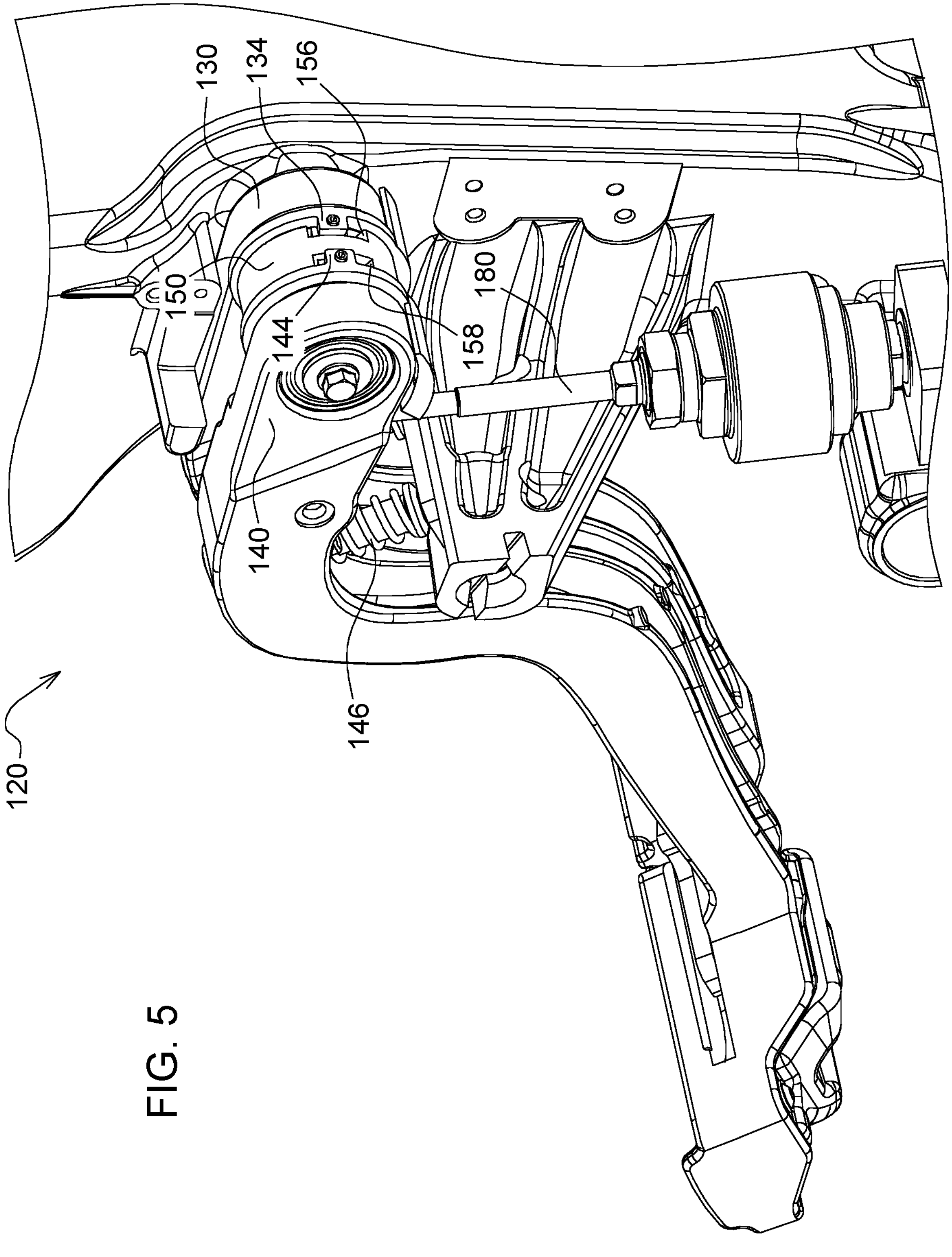
FIG. 5 is a rear perspective view representing an embodiment of a brake pedal feedback system as disclosed herein.
Figure 6:
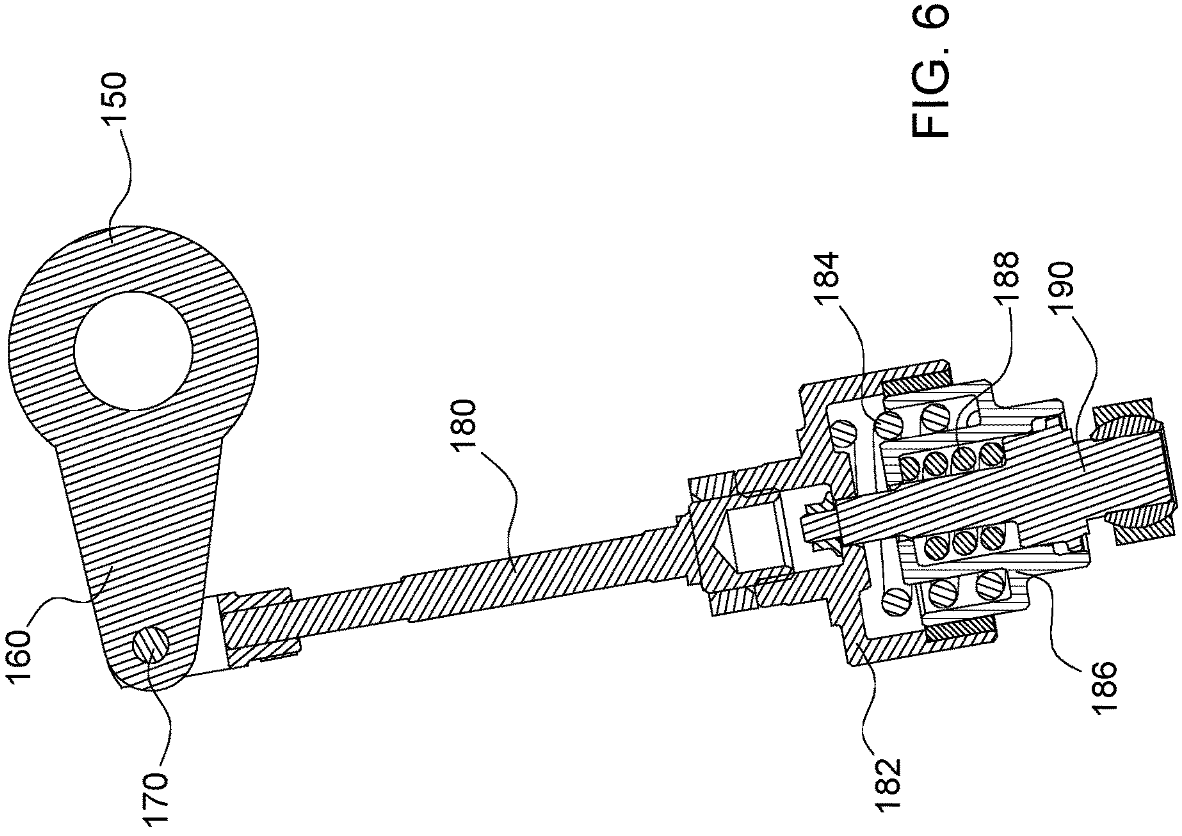
FIG. 6 is a right sectional view representing an embodiment of a brake pedal feedback system as disclosed herein.
Figure 7:
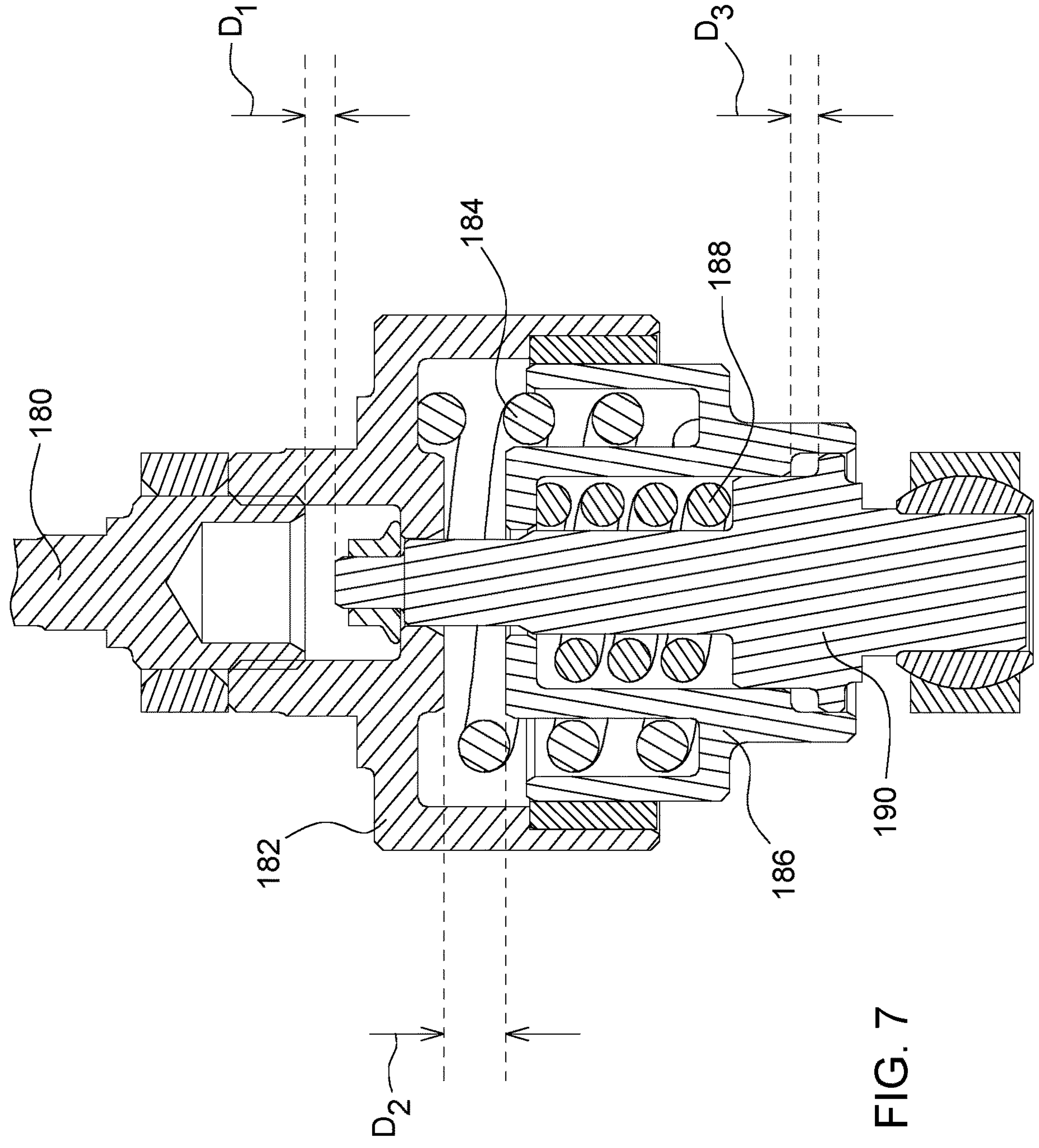
FIG. 7 is a right sectional view representing an embodiment of a brake pedal feedback system as disclosed herein.

FIG. 1 illustrates a work vehicle 100, for example an agricultural tractor. This disclosure also applies to other types of work vehicles in agriculture, construction, forestry, road building, and the like. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic machine. The work vehicle 100 can include any of various embodiments as disclosed herein of a brake pedal feedback system 120 and/or any of various embodiments as disclosed herein of a brake pedal position sensing system 300. In various embodiments, a brake pedal position sensing and feedback system 120, 300 may be described as incorporating elements from each of the respective systems which may otherwise be independently described and likewise implemented on a work vehicle 100. Even in embodiments wherein a brake pedal feedback system 120 and a brake pedal position sensing system 300 are each implemented and are described accordingly with reference to the accompanying figures, certain elements may be selectively omitted so that other components may be more clearly illustrated.

With reference to all the figures generally, a brake pedal position sensing and feedback system 120, 300 can be utilized with a left brake pedal 130 and a right brake pedal 140 in a brake-by-wire system. The left and right brake pedals 130, 140 include a disengaged position and an engaged position, which can include a plurality of partially engaged positions and a fully engaged position.

The work vehicle 100 as disclosed herein can further include a braking unit (not shown) which may be responsive to output signals from the brake pedal position sensing and feedback system 120, 300, directly or otherwise indirectly via command signals provided from a controller (not shown) functionally linked between the braking unit and the brake pedal position sensing and feedback system 120, 300. A controller for this purpose may be a vehicle control unit associated with the work vehicle 100 or even external to the work vehicle 100 in such embodiments. A controller may be configured to analyze the output signals, alone or in combination with other inputs, to determine brake status such as for example break wear or failure conditions. A controller may be embodied by or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general-purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The work vehicle 100 can further include a display unit (not shown), for example within the operator station or cab 102, for displaying at least information corresponding to an amount of angular displacement for the brake pedals, based on the output signals from the brake pedal position sensing and feedback system 120, 300.

According to various embodiments of at least a brake pedal feedback portion 120 of the brake pedal position sensing and feedback system 120, 300, a left return spring 136 biases the left brake pedal 130 in a disengaged position. The left return spring 136 can return and maintain the left brake pedal 130 in a disengaged position when the left brake pedal 130 is not being operated or utilized. A right return spring 146 biases the right brake pedal 140 in a disengaged position. A right return spring 146 can return and maintain the right brake pedal 140 in a disengaged position when the right brake pedal 140 is not being operated or utilized.

The brake pedal position sensing and feedback system 120 can include a spring driver 150 interacting with the left and right brake pedals 130, 140. The spring driver 150 and the left and right brake pedals 130, 140 can all rotate around an axis of rotation R. The spring driver 150 functions in a comparable manner and provides a similar or the same force feedback whether the left brake pedal 130 is in an engaged position, the right brake pedal 140 is in an engaged position, or both brake pedals 130, 140 are in engaged positions. The brake pedal feedback system 120 can include one or more bearings, seals, fasteners or other components as shown in the accompanying figures. The brake pedal feedback system 120 can include one or springs 184, 188, 222, 224. The spring driver 150 can interact with the one or more springs 184, 188, 222, 224.

Figure 11A:
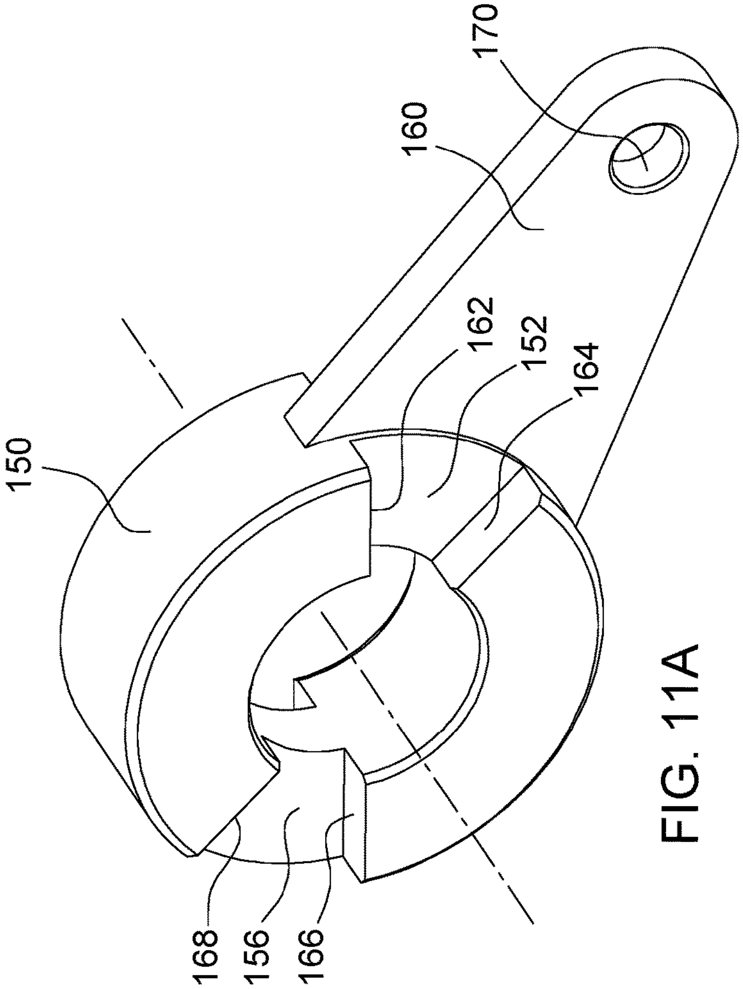
FIG. 11A is a left perspective view of a spring driver as disclosed herein.
Figure 11B:
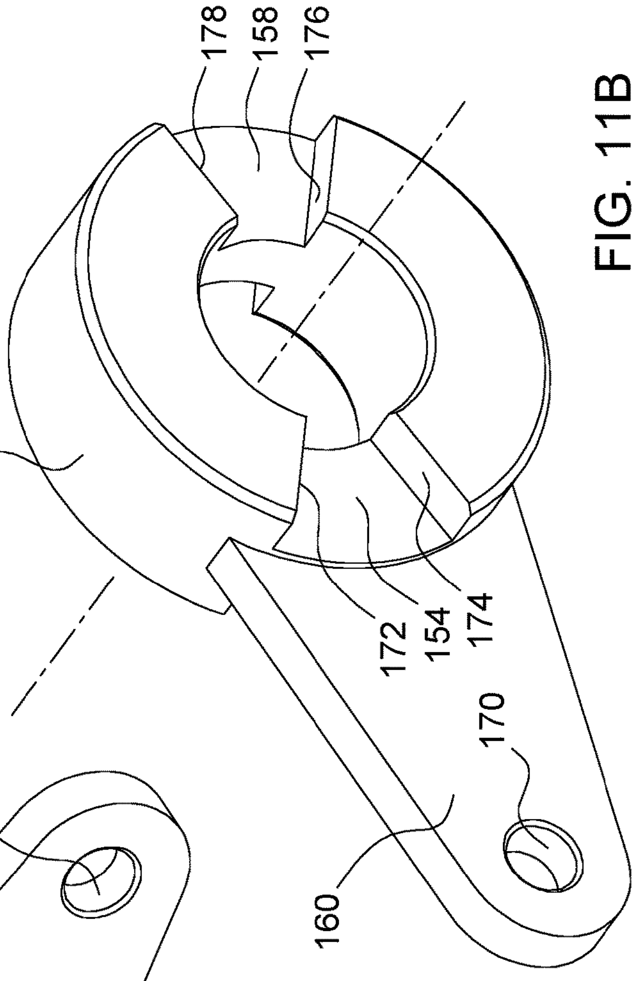
FIG. 11B is a right perspective view of a spring driver as disclosed herein.

The spring driver 150 is positioned between the left and right brake pedals 130, 140. The spring driver 150 can include a slot or recess 152 on the left side and a second slot or recess 154 on the right side. Alternatively, the spring driver 150 can include a two slots or recesses 154, 158 on the right side and two slots or recesses 152, 156 on the left side, as shown in FIGS. 11A and 11B. The recess 152 includes a first surface 162 and a second surface 164. The recess 156 includes a first surface 166 and a second surface 168. The recess 154 includes a first surface 172 and a second surface 174. The recess 158 includes a first surface 176 and a second surface 178.

Figure 12A:
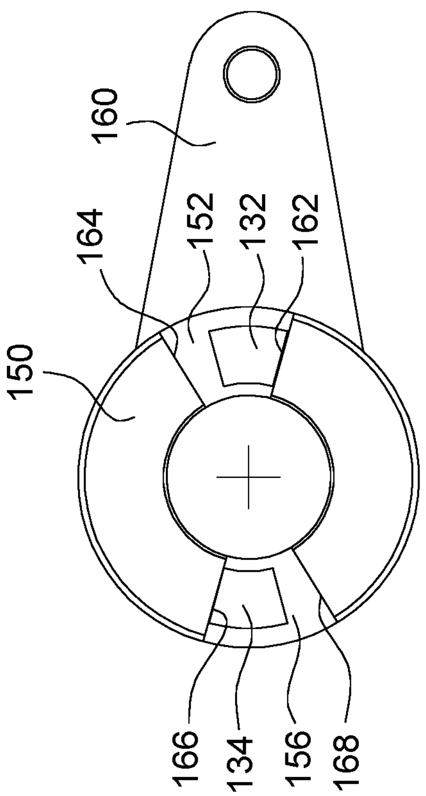
FIG. 12A is a left perspective view of a spring driver as disclosed herein.

The left brake pedal 130 can include a dog or extension 132 positioned at least partially within the recess 152. Alternatively, the left brake pedal 130 can include a dog or extension 132 positioned at least partially within the recess 152 and a dog or extension 134 positioned at least partially within the recess 156, as shown in FIGS. 12A and 12C. The right brake pedal 140 can include a dog or extension 142 positioned at least partially within the recess 154. Alternatively, the right brake pedal 140 can include a dog or extension 142 positioned at least partially within the recess 154 and a dog or extension 144 positioned at least partially within the recess 158, as shown in FIGS. 12B and 12D.

Figure 12B:
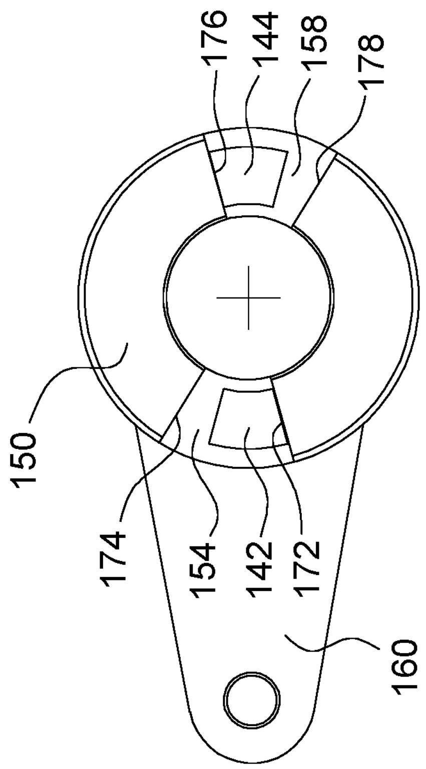
FIG. 12B is a right perspective view of a spring driver as disclosed herein.
Figure 12C:
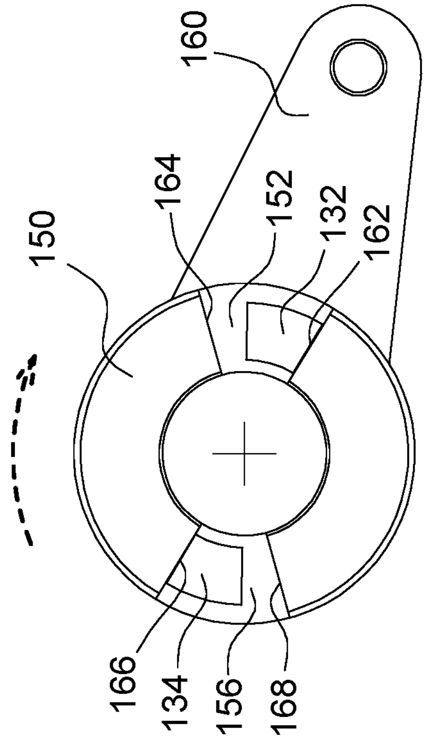
FIG. 12C is a left perspective view of a spring driver as disclosed herein.
Figure 12D:
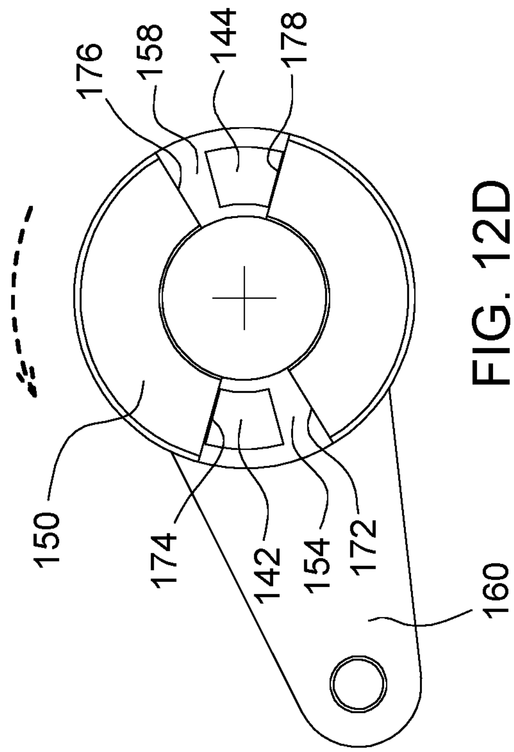
FIG. 12D is a right perspective view of a spring driver as disclosed herein.
Figure 13:
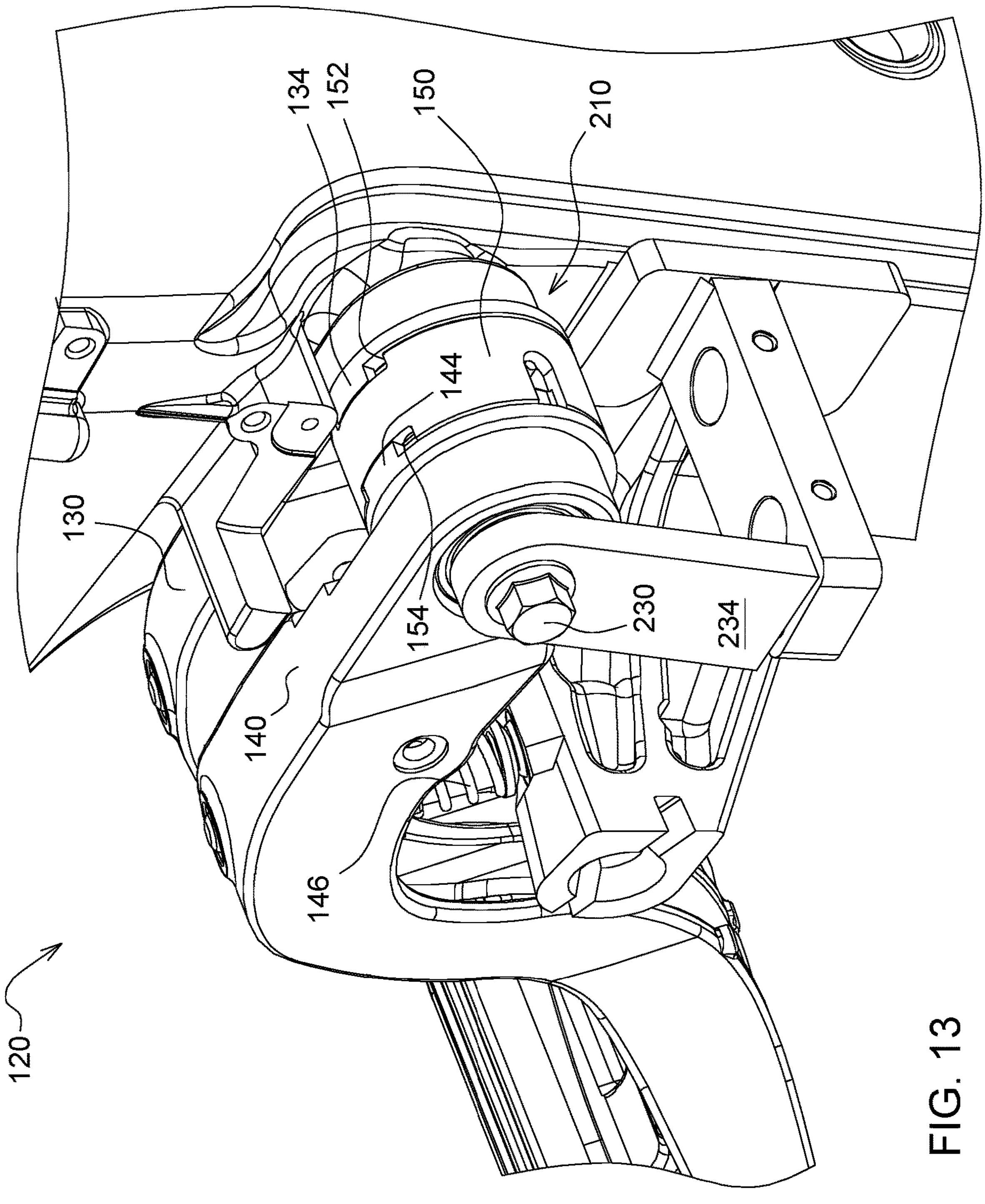
FIG. 13 is a rear perspective view of an embodiment of a brake pedal feedback system as disclosed herein.
Figure 14:
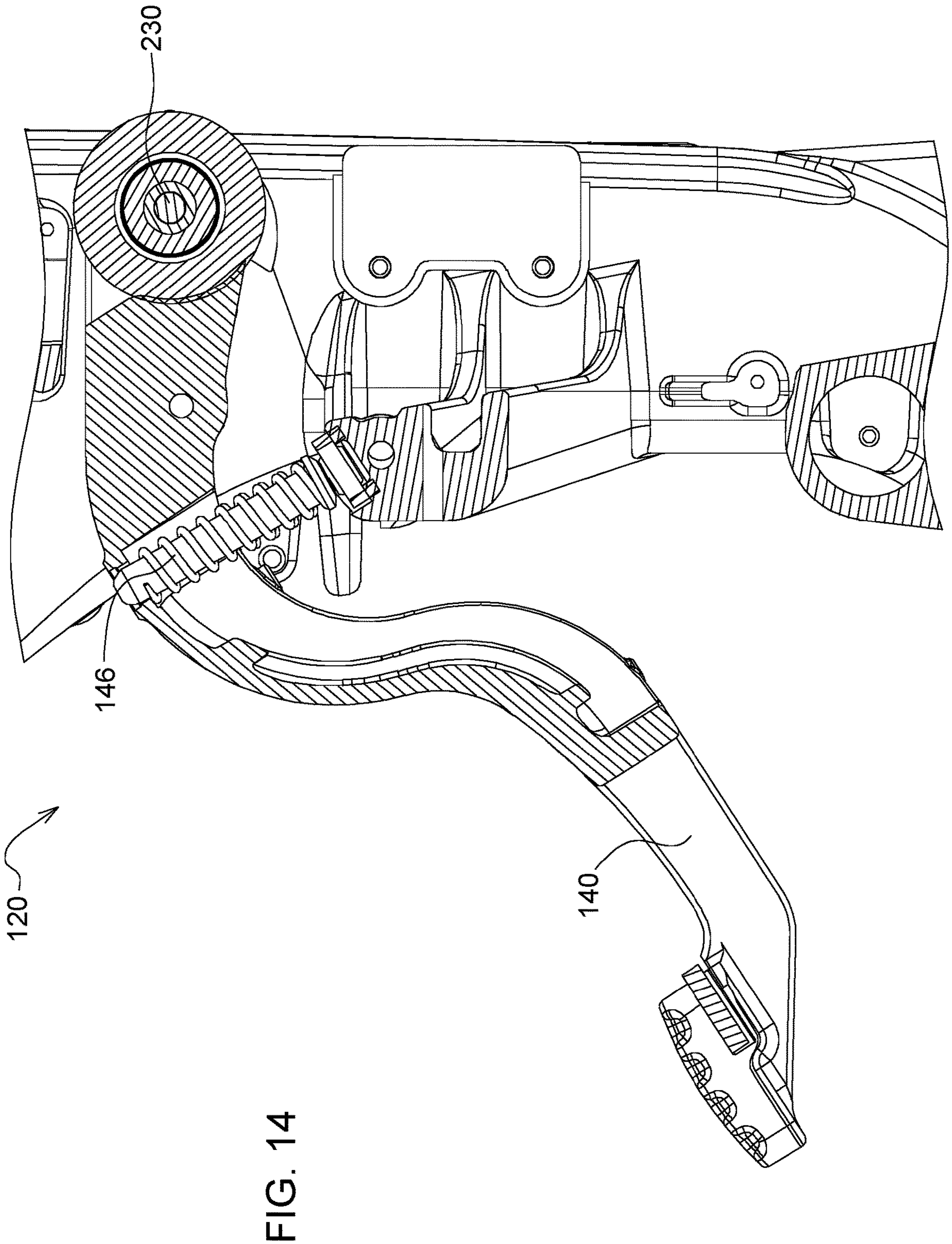
FIG. 14 is a right sectional view of an embodiment of a brake pedal feedback system as disclosed herein.
Figure 15:
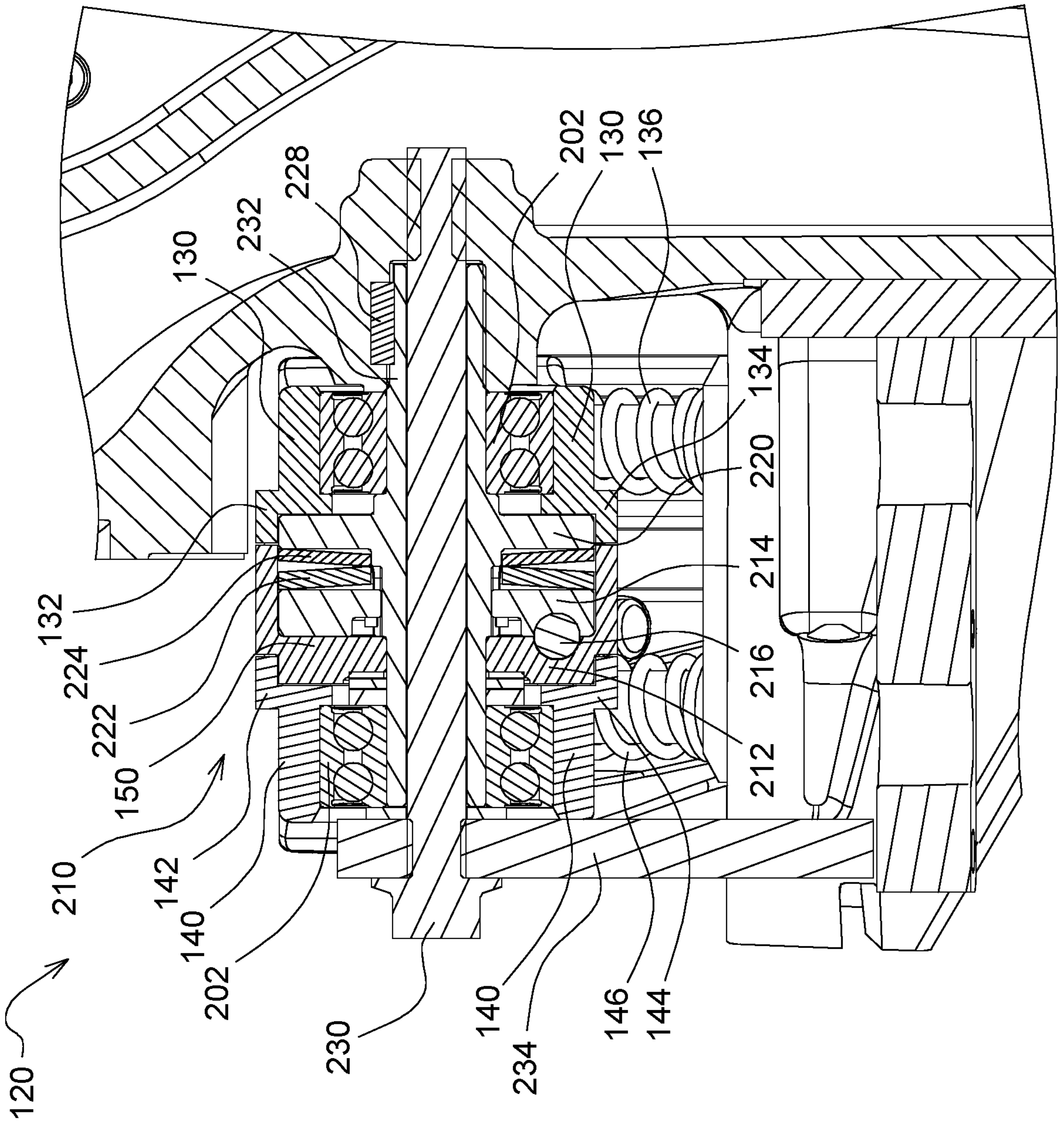
FIG. 15 is a rear sectional view of an embodiment of a brake pedal feedback system as disclosed herein.
Figures 16A, 16B:
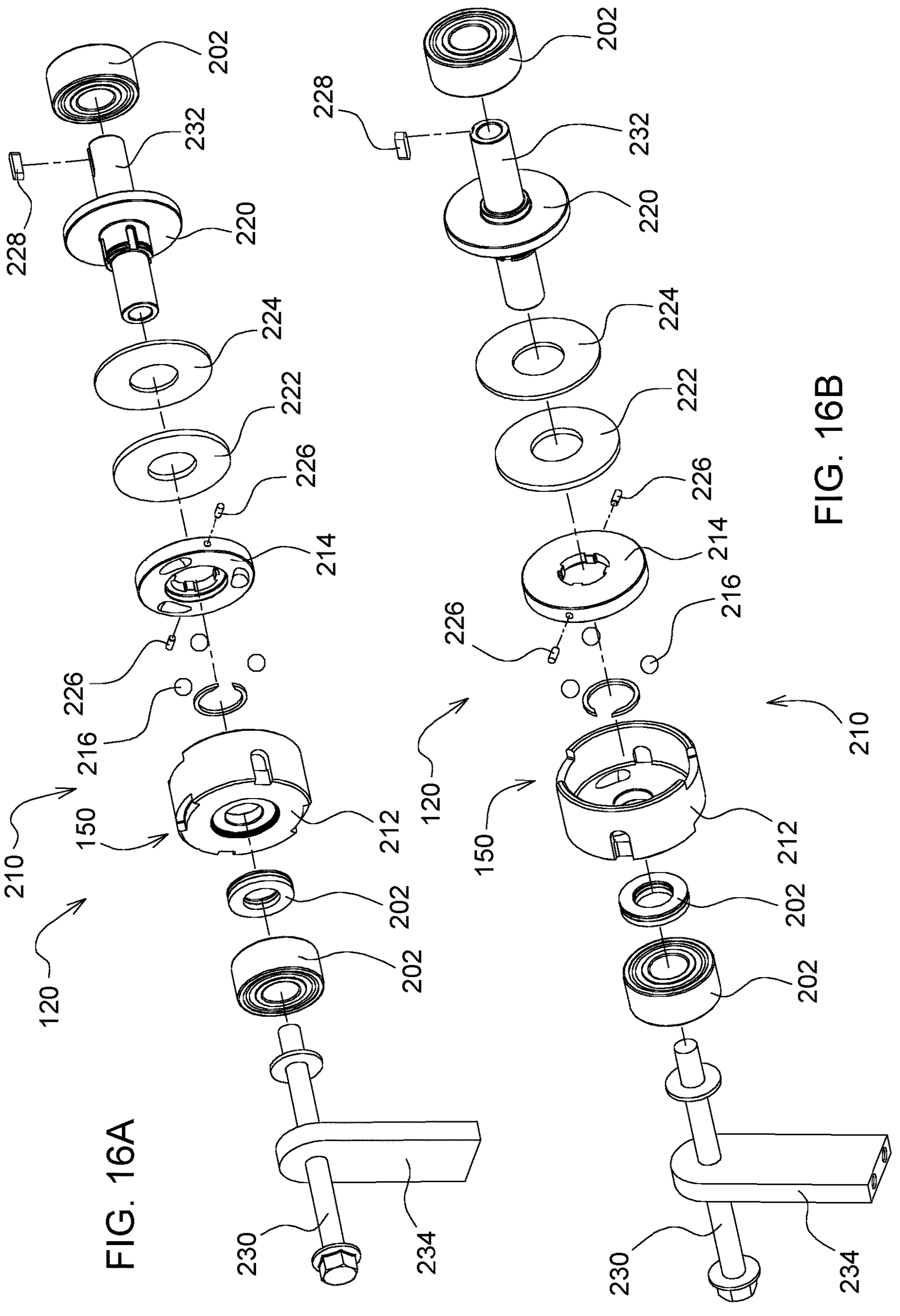
FIG. 16A is an exploded view of an embodiment of a brake pedal feedback system as disclosed herein.
FIG. 16B is an exploded view of an embodiment of a brake pedal feedback system as disclosed herein.
Figure 17:
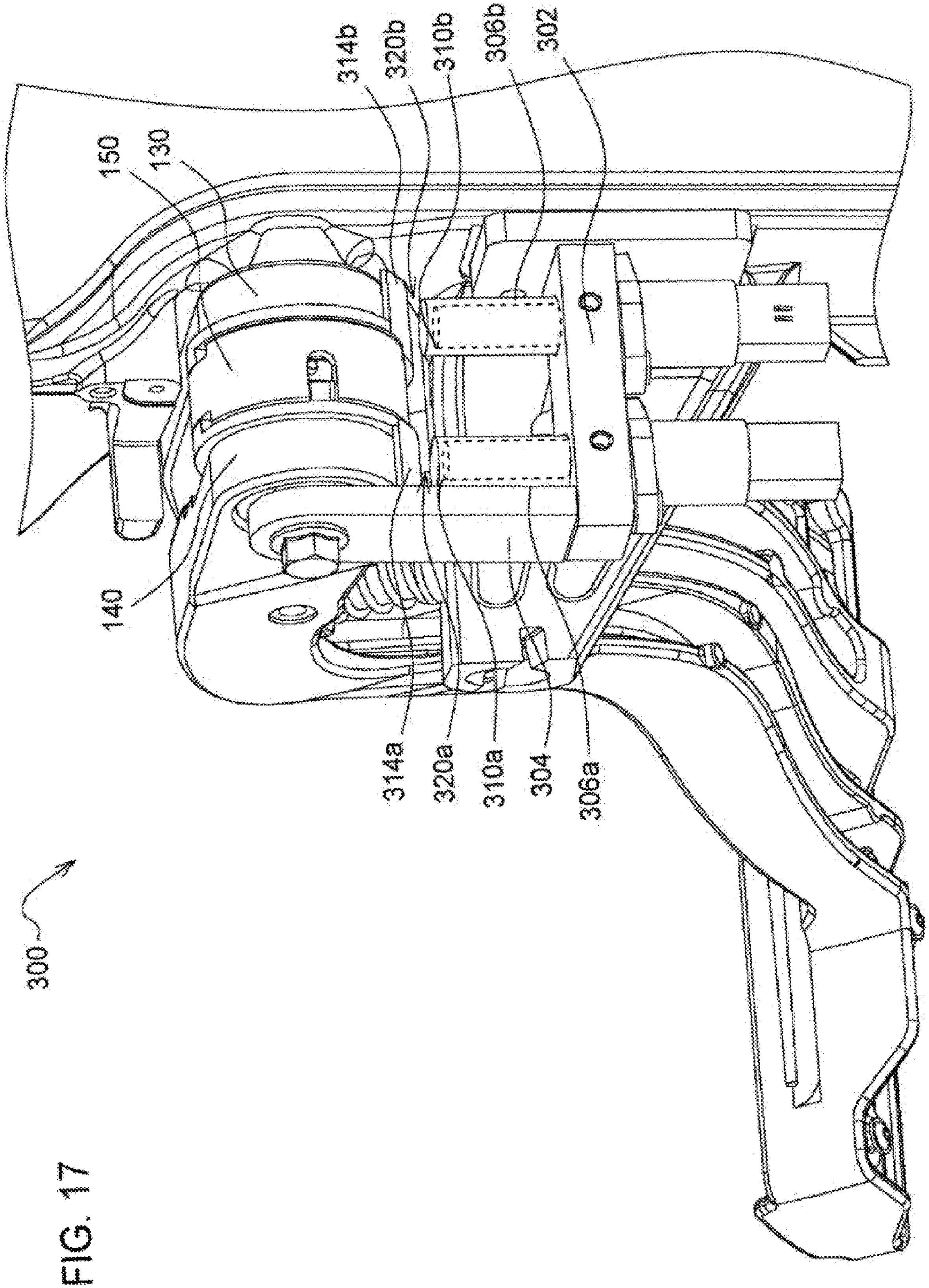
FIG. 17 is a perspective view representing an embodiment of a brake pedal position sensing system as disclosed herein.
Figure 18:
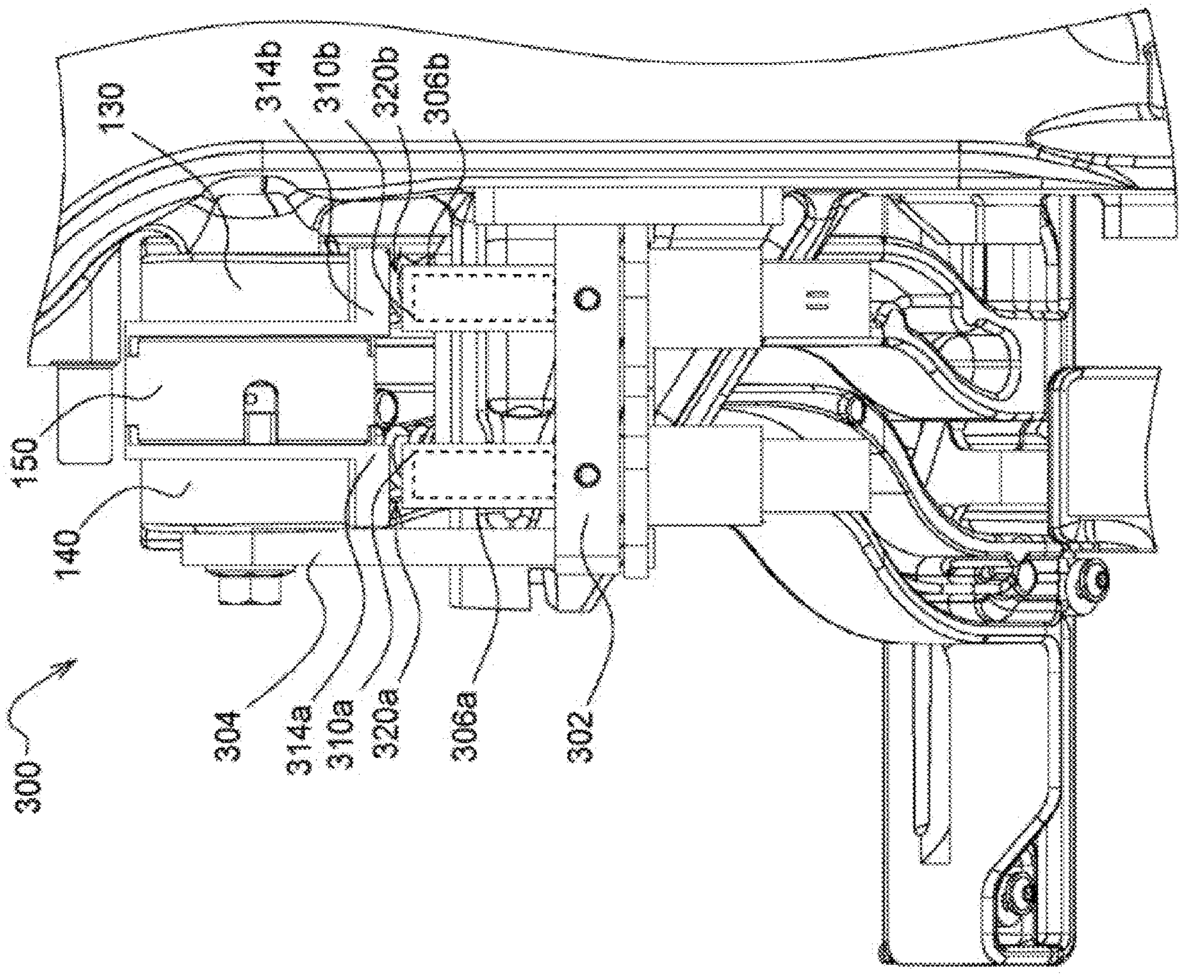
FIG. 18 is a rear view of the embodiment represented in FIG. 17.
Figure 19A:
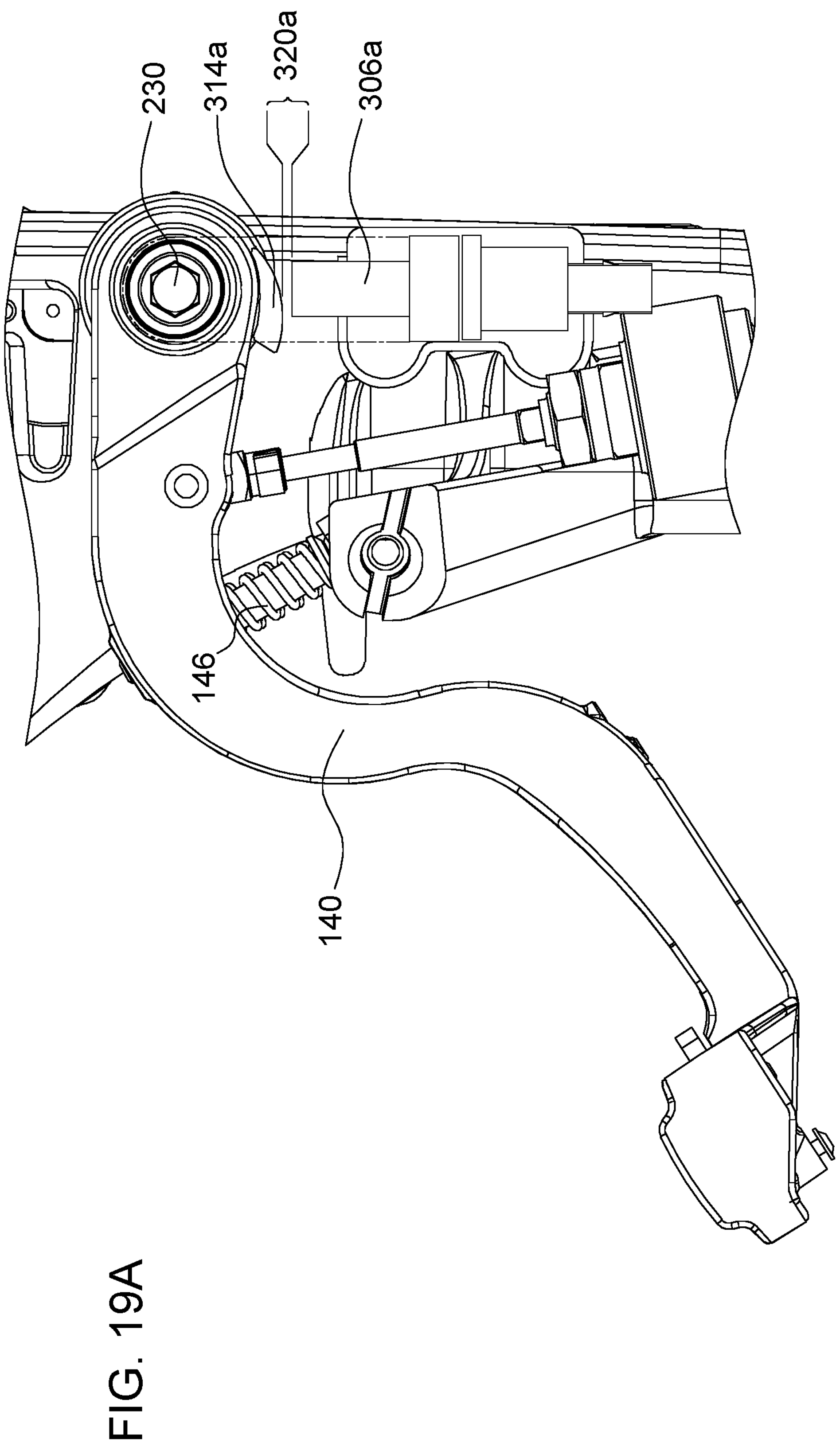
FIG. 19A is a side view of the embodiment represented in FIG. 17, with the right brake pedal engaged to a first position.
Figure 19B:
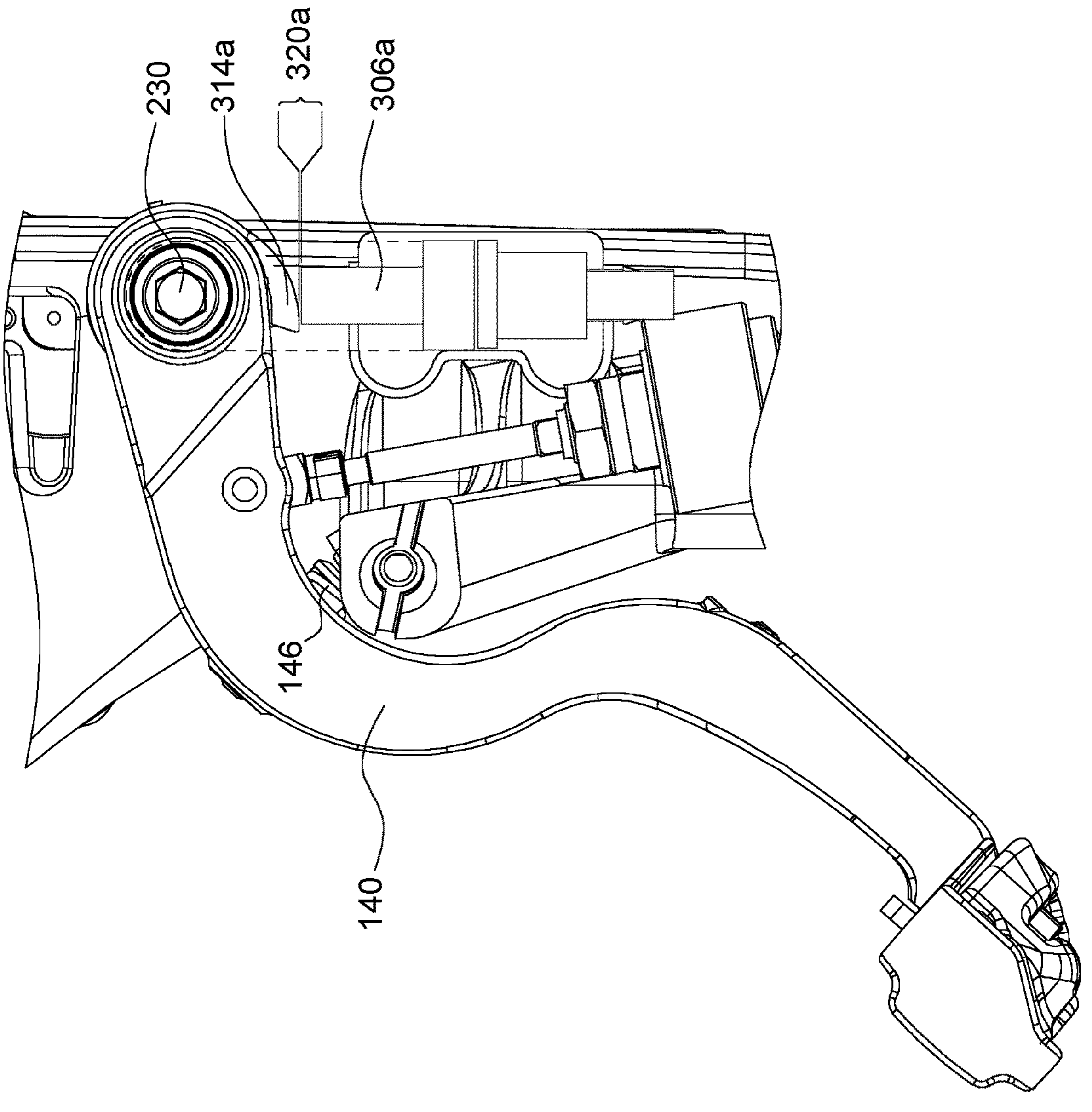
FIG. 19B is a side view of the embodiment represented in FIG. 17, with the right brake pedal engaged to a second position.

When both the left and right brake pedals 130, 140 are in a disengaged position, the extensions 132, 134, 142, 144 are positioned closer to one end of the recesses 152, 154, 156, 158 than the other end, as shown in FIGS. 12A and 12B. The extension 132 is positioned near a first surface 162 of the recess 152. The extension 134 is positioned near a first surface 166 of the recess 156. The extension 142 is positioned near a first surface 172 of the recess 154. The extension 144 is positioned near a first surface 176 of the recess 158.

When the left brake pedal 130 is pressed downward in one of the engaged positions, the left brake pedal 130 rotates about the axis of rotation R. The extension 132 contacts the first surface 162 of the recess 152 and the extension 134 contacts the first surface 166 of the recess 156, which causes the spring driver 150 to rotate with the left brake pedal 130, as shown in FIG. 12C. The right brake pedal 140 remains in the disengaged position and the extensions 142, 144 remain stationary with the right brake pedal 140, as shown in FIG. 12D. The extensions 142, 144 of the right brake pedal 140 are spaced apart or separated from the first ends 172, 176 of the recesses 154, 158. When the left brake pedal 130 is in one of the engaged positions, or in the fully engaged position, and the right brake pedal 140 is in the disengaged position, the extensions 142, 144 of the right brake pedal 140 can be positioned near the second ends 174, 178 of the recesses 154, 158.

When the right brake pedal 140 is pressed downward in one of the engaged positions, the right brake pedal 140 rotates about the axis of rotation R. The extension 142 contacts the first surface 172 of the recess 154 and the extension 144 contacts the first surface 176 of the recess 158, which causes the spring driver 150 to rotate with the right brake pedal 140. The left brake pedal 130 remains in the disengaged position and the extensions 132, 134 remain stationary with the left brake pedal 130. The extensions 132, 134 of the left brake pedal 130 are spaced apart or separated from the first ends 162, 166 of the recesses 152, 156. When the right brake pedal 140 is in one of the engaged positions, or in the fully engaged position, and the left brake pedal 130 is in the disengaged position, the extensions 132, 134 of the left brake pedal 130 can be positioned near the second ends 164, 168 of the recesses 152, 156.

According to some implementations, the spring driver 150 can include an arm or extension 160 pivotally or rotatably connected to a push rod 180 at connection 170, as shown in FIGS. 2-7. When the spring driver 150 rotates based upon one or more of the brake pedals 130, 140 being pressed downward in one of the engaged positions, the push rod 180 moves based in part on the length of the extension 160. The push rod 180 can interact with one or more springs 184, 188. The push rod 180 is connected to a spring receiver 182 contacting a first end of a spring 184. A spring receiver 186 contacts a second end of the spring 184 and a first end of a spring 188. A push rod 190 connects to the frame or chassis 110 and contacts a second end of the spring 188. The spring receiver 182 moves with the push rod 180 to compress the spring 184 between the spring receiver 182 and the spring receiver 186 from a relaxed condition to an energy storing condition. When compressed, the spring 184 exerts a force to return the spring driver 150 and the one or more engaged brake pedal 130, 140 to the disengaged position. The force of the spring 184 against the spring receiver 186 compresses spring 188 between the spring receiver 186 and the push rod 190 from a relaxed condition to an energy storing condition. When compressed, the spring 188 exerts a force to return the spring driver 150 and the one or more engaged brake pedal 130, 140 to the disengaged position.

The stiffness or spring constant of the spring 184 can be the same as, greater than, or less than the stiffness or spring constant of the spring 188. The spring constants of the springs 184, 188 can be selected to provide the desired feedback as at least one of the brake pedals 130, 140 is pressed downward in one of the engaged positions. The springs 184, 188 can have a constant or variable stiffness. The springs 184, 188 can be helical springs. A distance $D_1$ is the total travel of the push rod 180. The spring 184 can be compressed a distance $D_2$ until the spring receiver 182 contacts the spring receiver 186. The spring 188 can be compressed a distance $D_3$ until the spring receiver 186 contacts the push rod 190. The distance $D_1$ is equal to the combined distance $D_2$ and distance $D_3$. As one or both brake pedals 130, 140 are pressed downward in one of the engaged positions, the compression of the springs 184, 188 depends upon the relative stiffness of the springs 184, 188 and the relative dimensions of distances $D_1$, $D_2$ and $D_3$. The springs 184, 188 could compress individually in any order or simultaneously. When the one or more engaged brake pedals 130, 140 are released, one or more of the springs 184, 188 move the spring receivers 182, 186, the push rod 180, and the spring driver 150 back to the disengaged position. The left and right return springs 136, 146 maintain the left and right brake pedals 130, 140 in the disengaged position.

Figure 8:
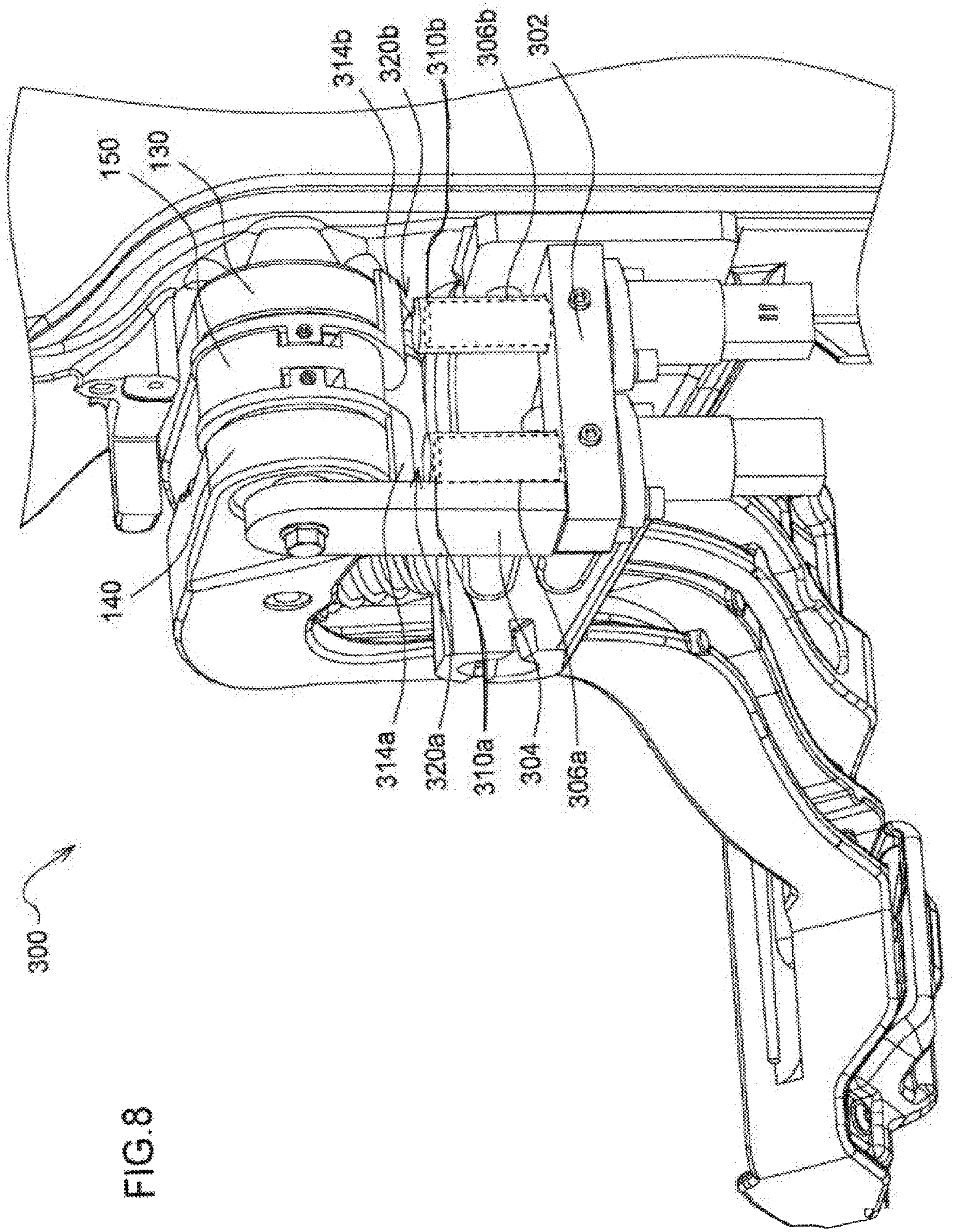
FIG. 8 is a rear perspective view representing an embodiment of a brake pedal position sensing system as disclosed herein.
Figure 9:
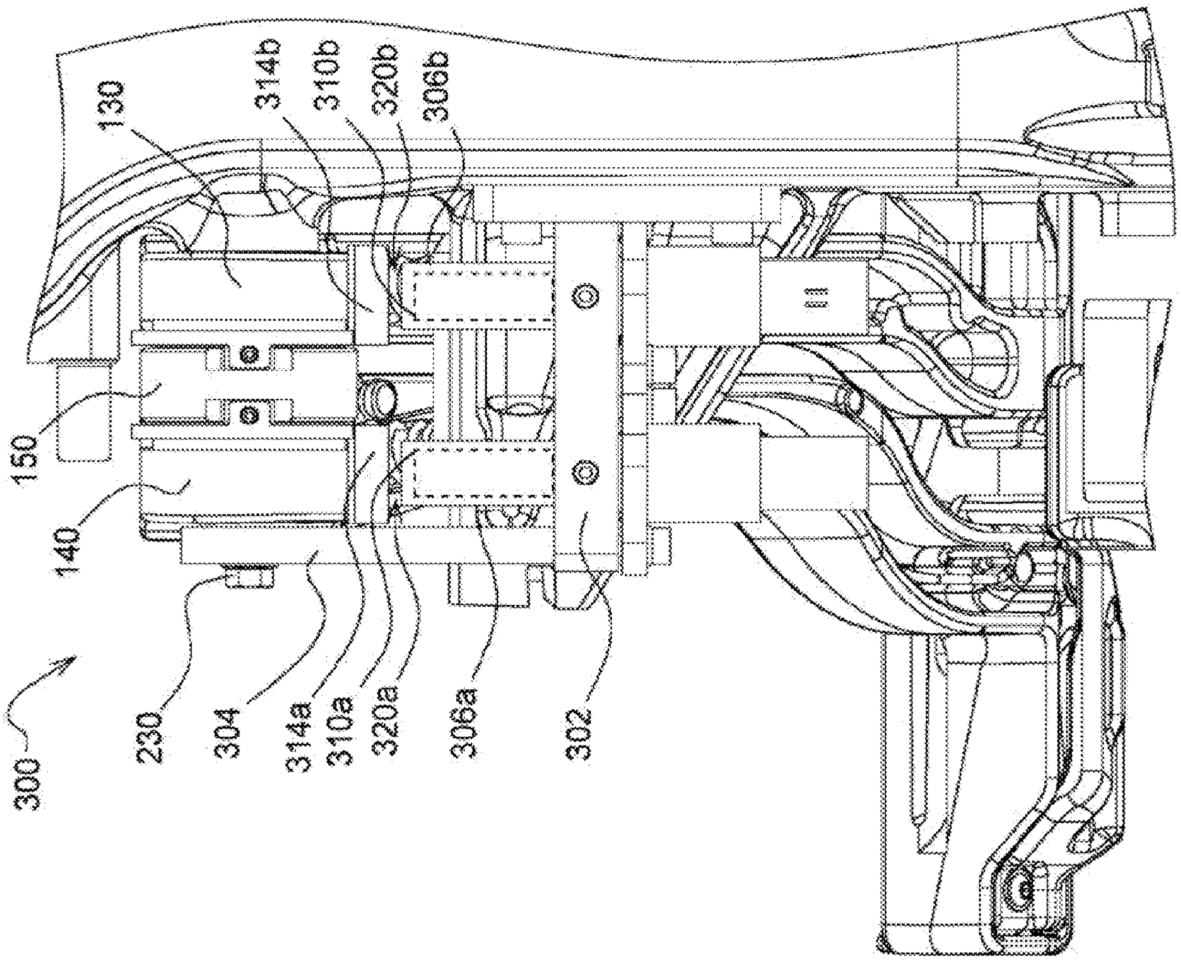
FIG. 9 is a rear view of the embodiment represented in FIG. 8.

Again by reference to all of the figures generally, various embodiments of a brake pedal position sensing portion 300 of the brake pedal position sensing and feedback system 120 include a sensor bracket 302 to which a support member 304 is coupled on one end, with an opposing end of the support member being coupled to a connection 230 associated with the axis of rotation R. By exemplary reference to the perspective rear view in FIG. 8 for illustration, the support member 304 may generally extend or otherwise be oriented substantially orthogonally with respect to the axis of rotation R, whereas the sensor bracket 302 is oriented substantially in parallel with the axis of rotation R.

A first sensor housing 306*a* is mounted to the sensor bracket 302 and aligned with the right brake pedal 140 in a substantially orthogonal orientation with respect to the axis of rotation R, such that a first sensor 310*a* disposed within the first sensor housing 306*a* is oriented toward the right brake pedal 140. The first sensor housing 306*a* as illustrated is cylindrical in shape and arranged to enclose and substantially orient the first sensor 310*a*, as well as to preferably protect the first sensor 310*a* from ambient conditions and related elements. However, such an exemplary form is non-limiting unless otherwise explicitly stated and alternative shapes and arrangements may be contemplated by one of skill in the art to provide equivalent functions.

A first cam 314*a* is coupled in association with the right brake pedal 140, such that rotation (angular displacement) of the right brake pedal 140 provides a corresponding rotation (angular displacement) of the first cam 314*a*. The first cam 314*a* is configured such that an air gap 320*a* between the first cam 314*a* and the first sensor 310*a* at any time corresponds to a position (i.e., amount of angular displacement) of the right brake pedal 140. In the illustrated embodiment, pressure applied to the right brake pedal 140 causes angular displacement of the right brake pedal 140 to produce a smaller air gap 320*a* between the first cam 314*a* and the first sensor 310*a* which is spatially fixed relative to the axis of rotation R, and reducing the pressure applied to the right brake pedal 140 likewise produces a larger air gap 320*a* between the first cam 314*a* and the first sensor 310*a*, but such a relationship may be inverted in other embodiments based on alternative configurations of the cam 314*a* relative thereto.

Likewise, a second sensor housing 306*b* is mounted to the sensor bracket 302 and aligned with the left brake pedal 130 in a substantially orthogonal orientation with respect to the axis of rotation R, such that a second sensor 310*b* disposed within the second sensor housing 306*b* is oriented toward the left brake pedal 130. A second cam 314*b* is coupled in association with the left brake pedal 130, such that rotation (angular displacement) of the left brake pedal 130 provides a corresponding rotation (angular displacement) of the second cam 314*b*. The second cam 314*b* is configured such that an air gap 320*b* between the second cam 314*b* and the second sensor 310*b* at any time corresponds to a position (i.e., amount of angular displacement) of the left brake pedal 130.

Figure 10A:
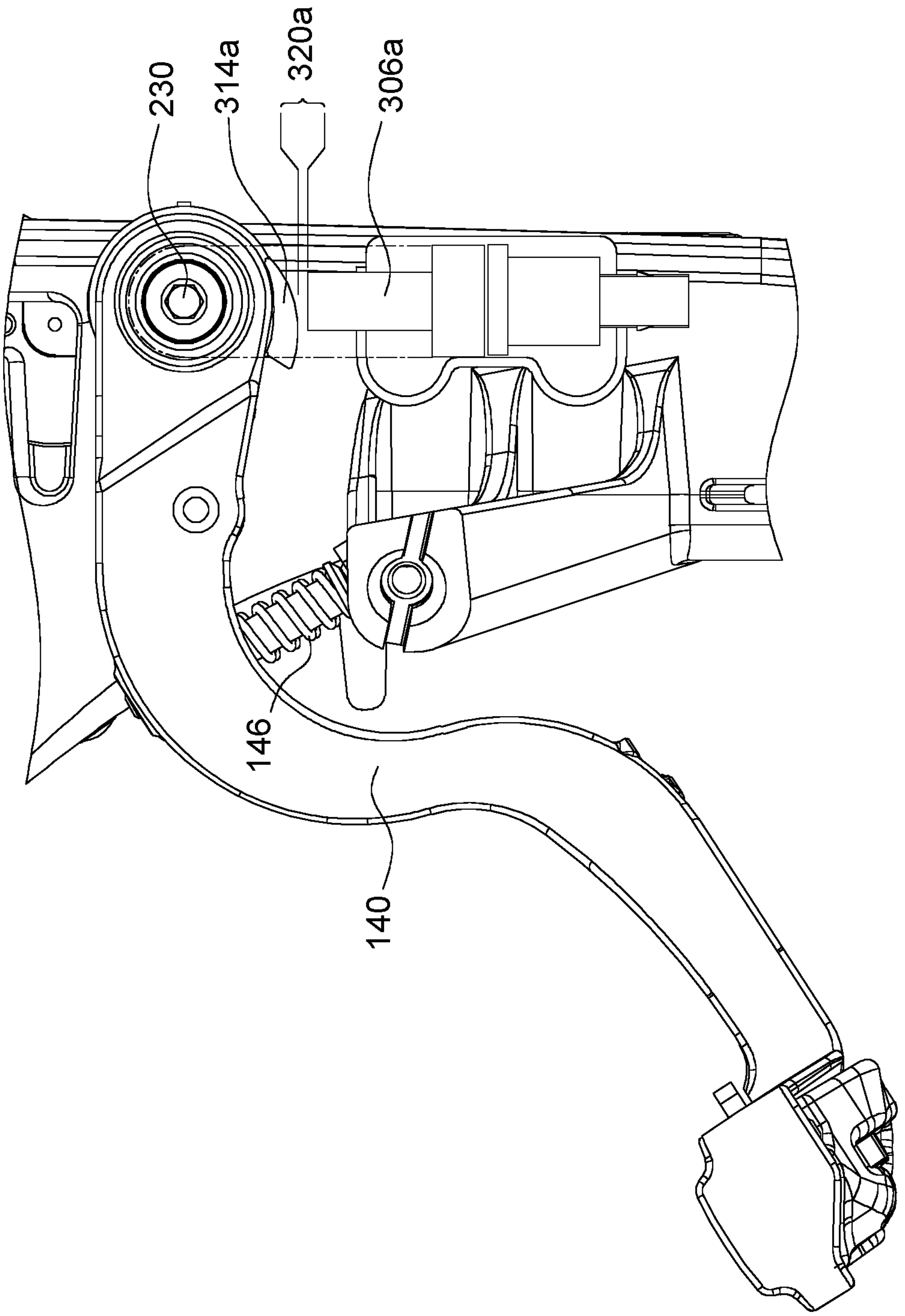
FIG. 10A is a side view of the embodiment represented in FIG. 8, with the right brake pedal engaged to a first position.
Figure 10B:
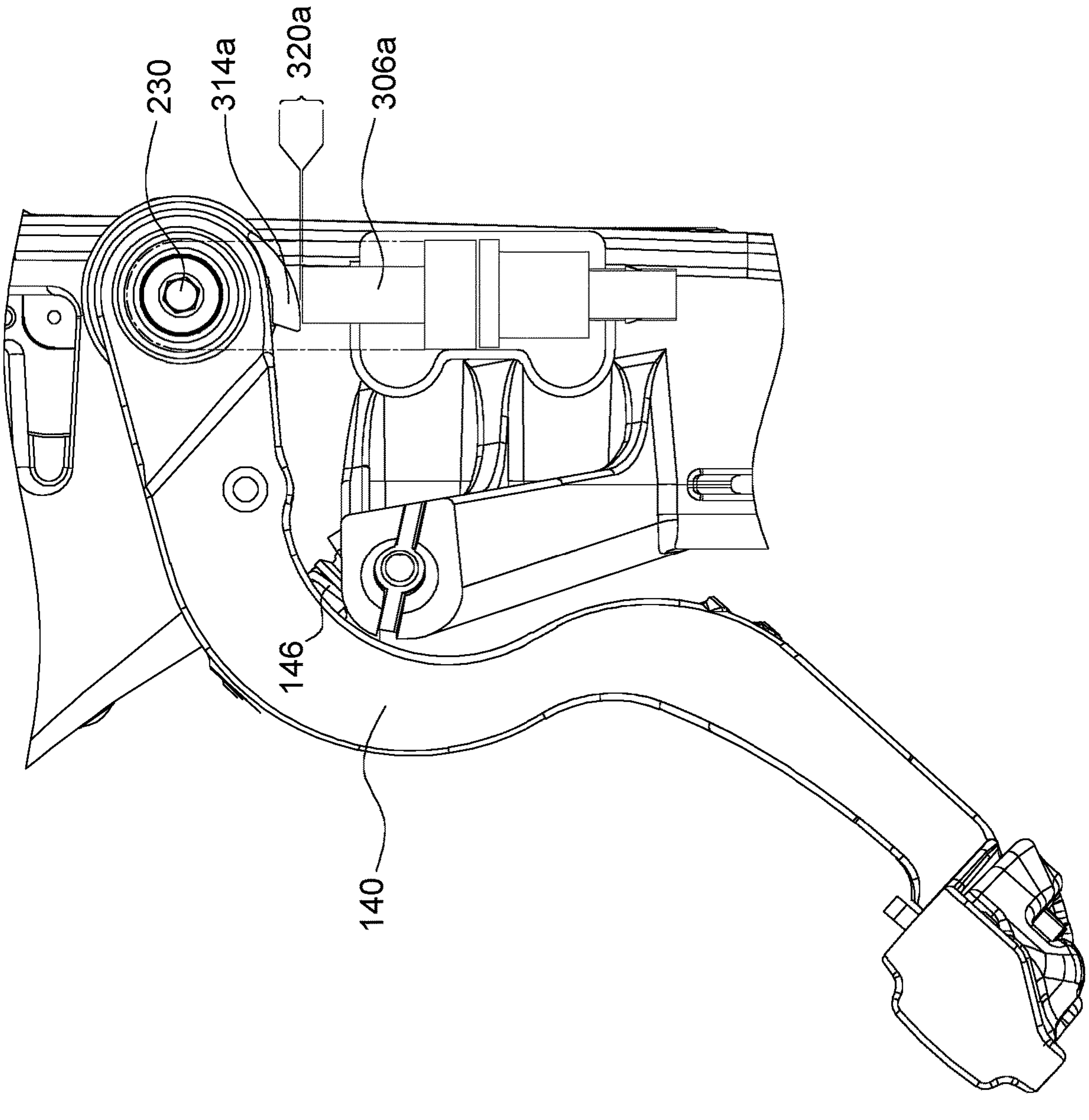
FIG. 10B is a side view of the embodiment represented in FIG. 8, with the right brake pedal engaged to a second position.

For each of the first sensor 310*a* and the second sensor 310*b*, output signals provided there from may correspond to sensed air gaps 320*a*, 320*b*, respectively, which correspond as mentioned above to the positions (i.e., amounts of angular displacement) of the right brake pedal 140 and the left brake pedal 130, respectively. For example, with reference to an embodiment of a brake pedal position sensing system 300 as illustrated in FIGS. 8 to 10B, the right brake pedal 140 and the first sensor cam 314*a* in FIG. 10A are shown as being displaced to a first position corresponding to a first air gap 320*a*, while the same right brake pedal 140 and first sensor cam 314*a* are shown in FIG. 10B as being displaced to a further second position corresponding to a smaller air gap 320*a*. The first sensor 310*a* in an embodiment may be appropriately calibrated to correlate varying sensed air gaps 320*a* with respect to rotation/angular displacement of the right brake pedal 140. Alternatively, a downstream data processor such as a controller may be appropriately calibrated to correlate raw signals based on the varying sensed air gaps 320*a* with respect to rotation/angular displacement of the right brake pedal 140.

The output signals may for example be provided to the controller for further producing command signals for braking control with respect to the power source(s) of the work vehicle 100. The output signals may for example be provided to a display unit, directly or via the controller or other appropriately configured intermediary, for displaying information such as text, numeric values, or other equivalent indicia to a user regarding the positions (i.e., amounts of angular displacement) of the right brake pedal 140 and the left brake pedal 130, respectively.

In various embodiments, the first sensor 310*a* and the second sensor 310*b* may be linear transducers, and in one embodiment may preferably be back-biased Hall effect sensors as are known in the art for determining the rotational position of a magnet relative thereto. Each of the first sensor cam 314*a* and the second sensor cam 314*b* may for example have a magnet integrated or otherwise coupled thereto, such that the respective sensors 310*a*, 310*b* measure in non-contact fashion changes in alignment of a magnetic field corresponding to rotation/angular displacement of the respective brake pedals 140, 130.

Turning next for illustration to FIGS. 13-16B, according to some implementations of a brake pedal feedback system 120 as disclosed herein, the spring driver 150 can include a ball ramp 210 having a rotating ramp 212, a sliding ramp 214, and a plurality of balls 216. The ball ramp 210 can be positioned between the left and right brake pedals 130, 140. A shaft 232 includes a support disc 220 spaced apart from the sliding ramp 214. The sliding ramp 214 is connected to the shaft 232 to prevent rotation of the sliding ramp 214 relative to the shaft 232. The sliding ramp 214 can move axially along the shaft 232. The sliding ramp 214 can include one or more pins 226. The shaft 232 can include a key 228. When the spring driver 150 rotates based upon one or more of the brake pedals 130, 140 being pressed downward in one of the engaged positions, the rotating ramp 212 rotates relative to the sliding ramp 214 causing the sliding ramp 214 to move towards the support disc 220. The sliding ramp 214 compresses one or more springs 222, 224 between the sliding ramp 214 and the support disc 220, which compresses one or more of the springs 222, 224 from a relaxed condition to an energy storing condition. When compressed, one or more of the springs 222, 224 exert a force to return the spring driver 150 and the one or more engaged brake pedal 130, 140 to the disengaged position. When the one or more engaged brake pedals 130, 140 are released, the springs 222, 224 move the sliding ramp 214 back towards the rotating ramp 212 and the spring driver 150 back to the disengaged position. The left and right return springs 136, 146 maintain the left and right brake pedals 130, 140 in the disengaged position.

Figure 20:
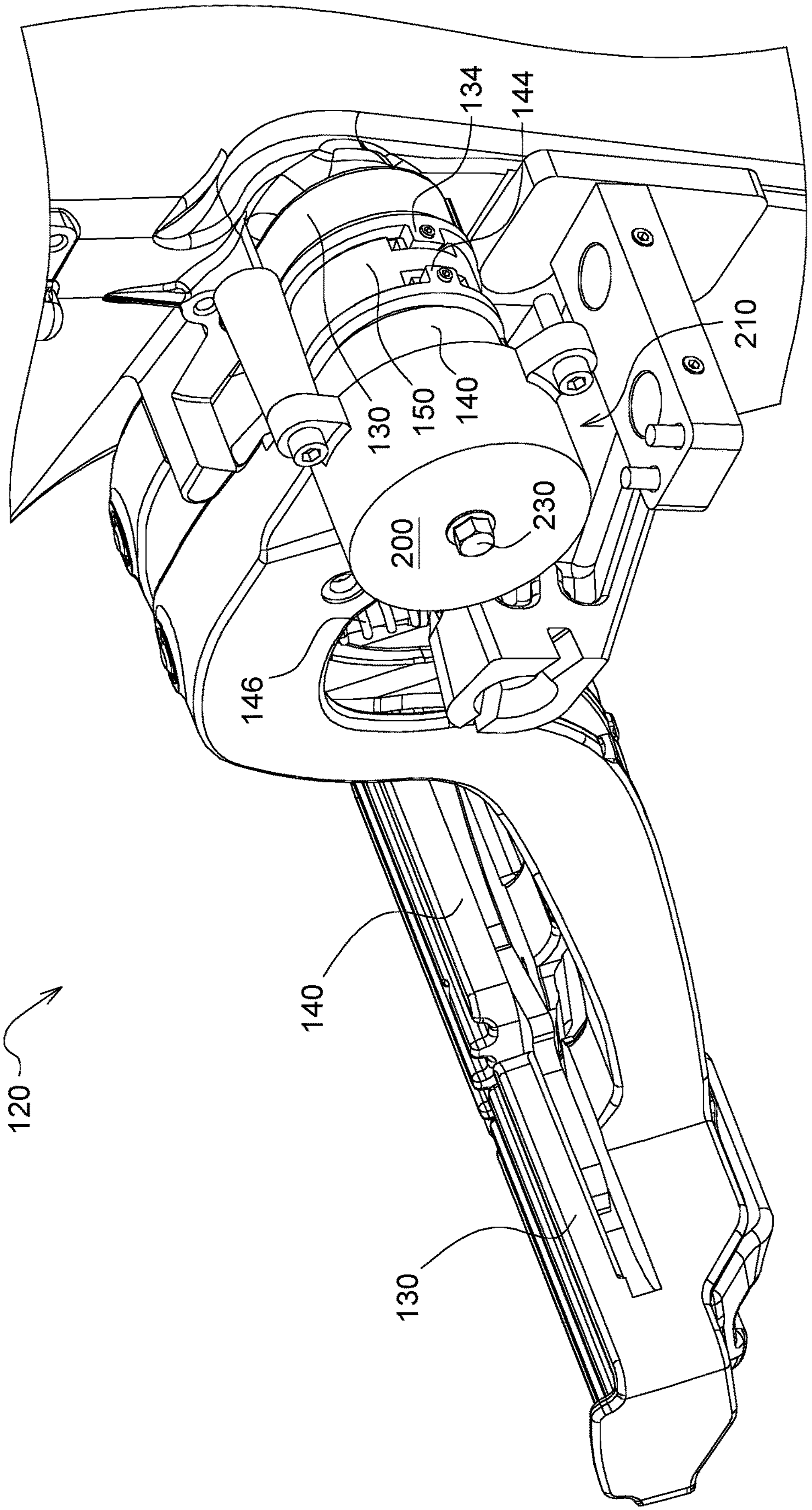
FIG. 20 is a rear perspective view of a portion of a brake pedal feedback system, according to an embodiment as disclosed herein.
Figure 21:
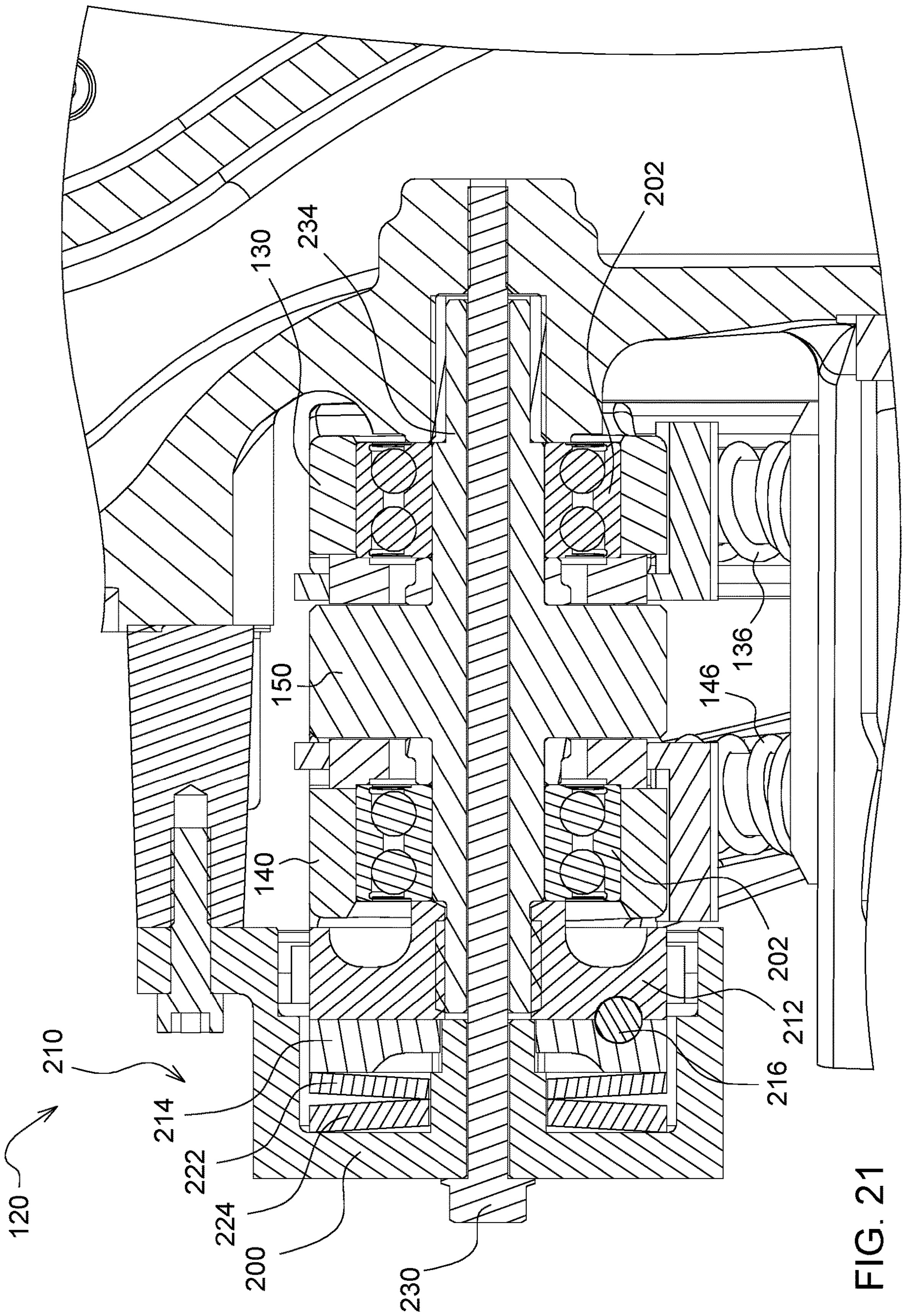
FIG. 21 is a rear sectional view of a portion of a brake pedal feedback system, according to an embodiment as disclosed herein.
Figure 22:
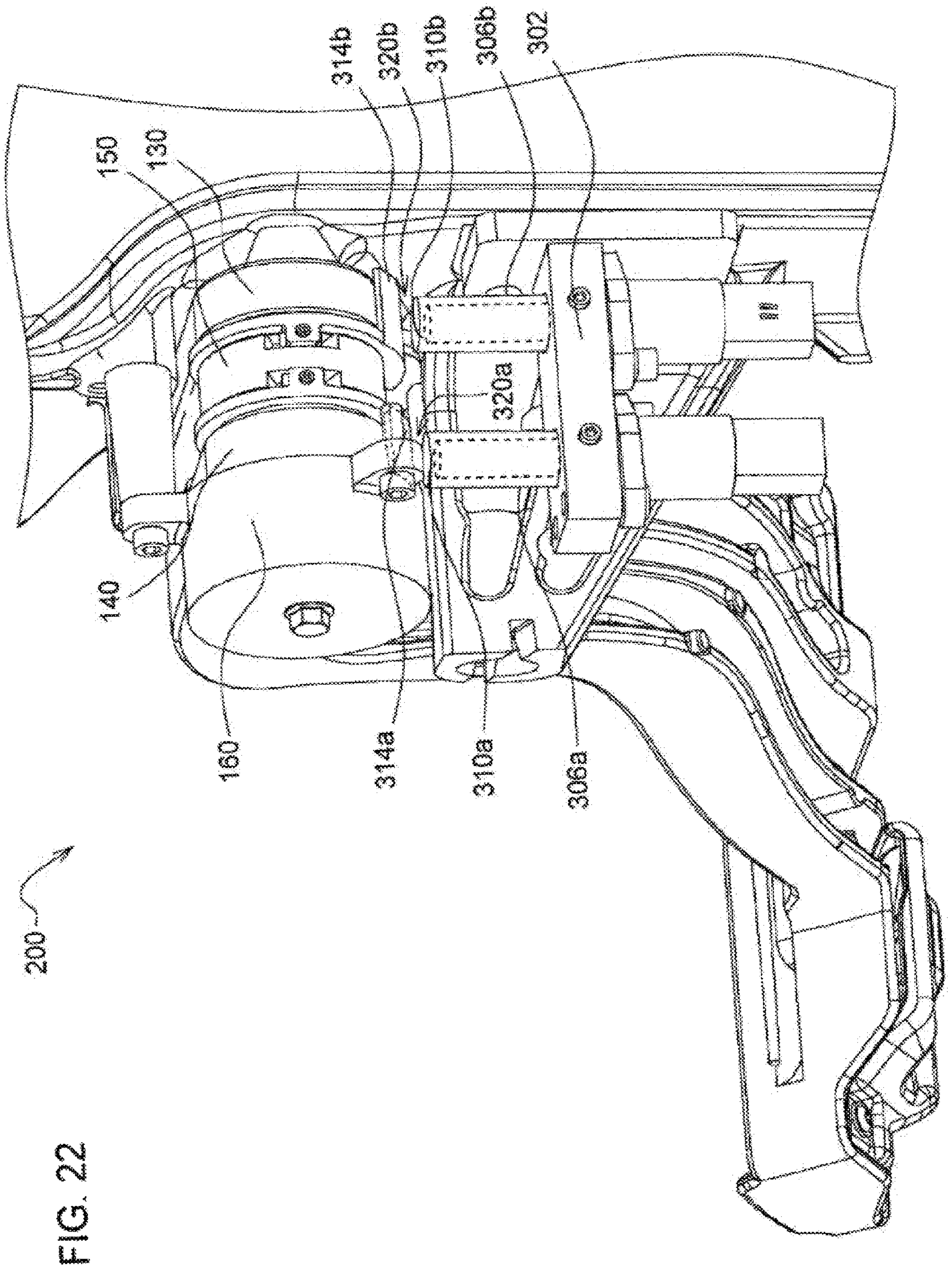
FIG. 22 is a rear perspective view representing an embodiment of a brake pedal position sensing system as disclosed herein.
Figure 23:
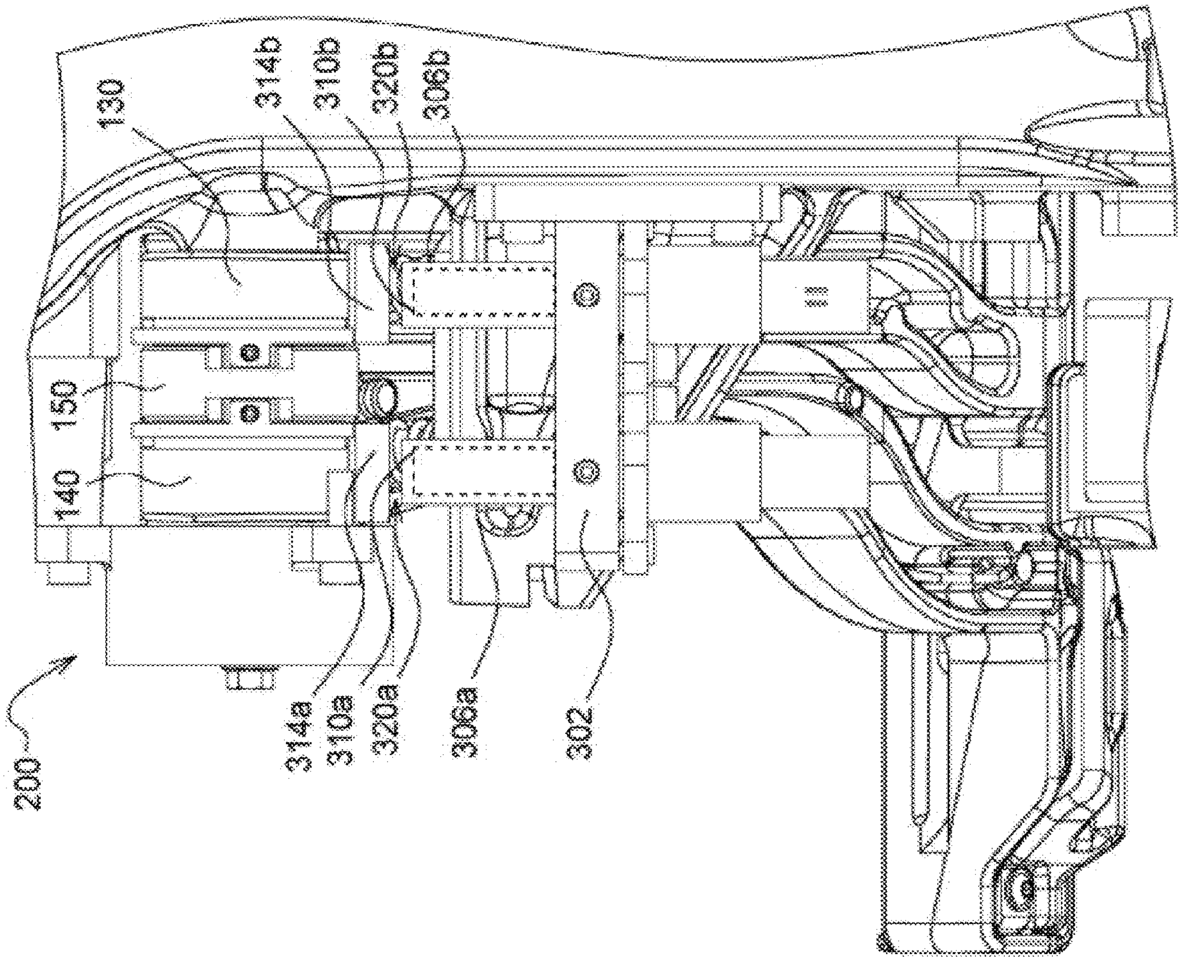
FIG. 23 is a rear view of the embodiment represented in FIG. 22.
Figure 24A:
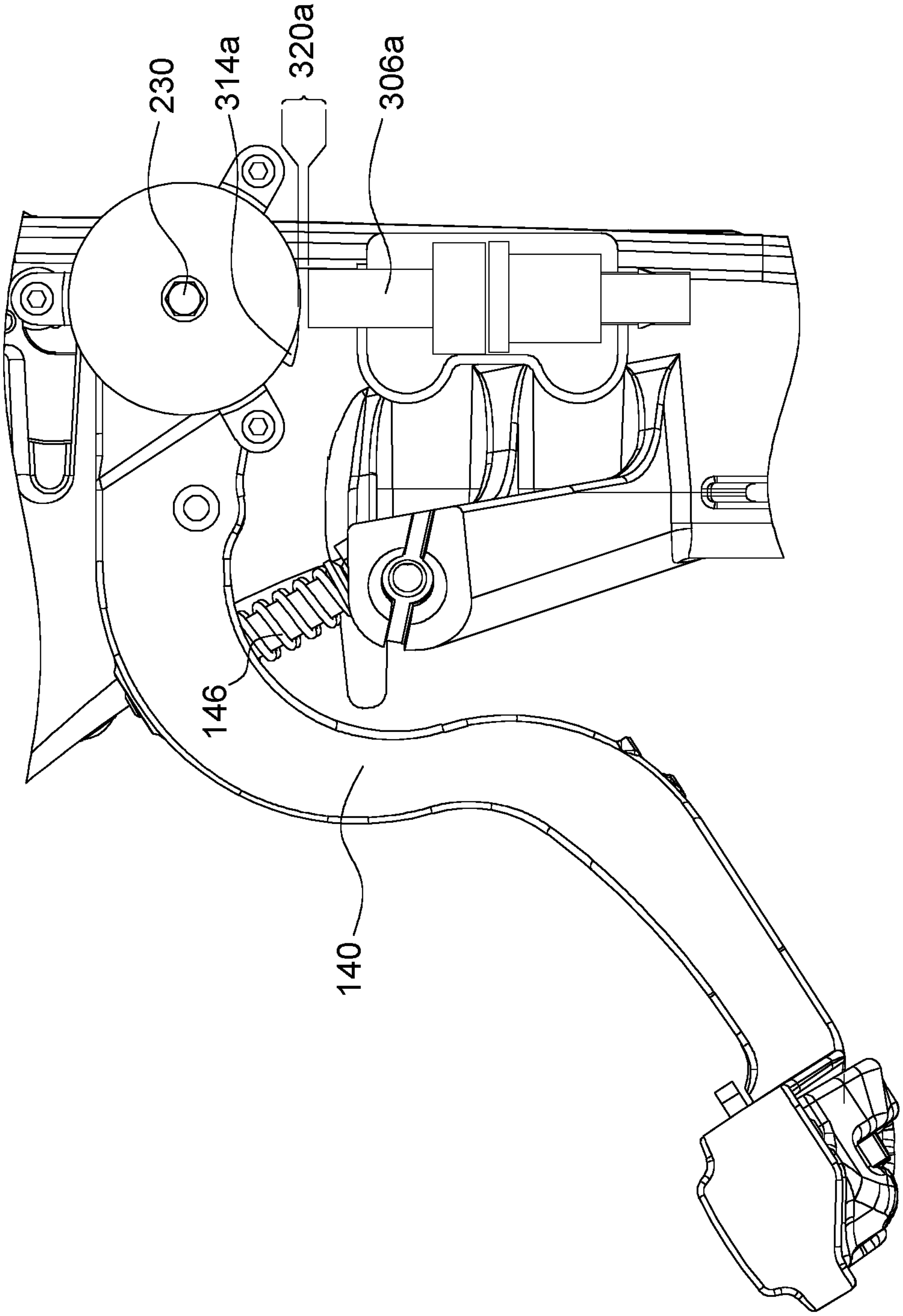
FIG. 24A is a side view of the embodiment represented in FIG. 22, with the right brake pedal engaged to a first position.
Figure 24B:
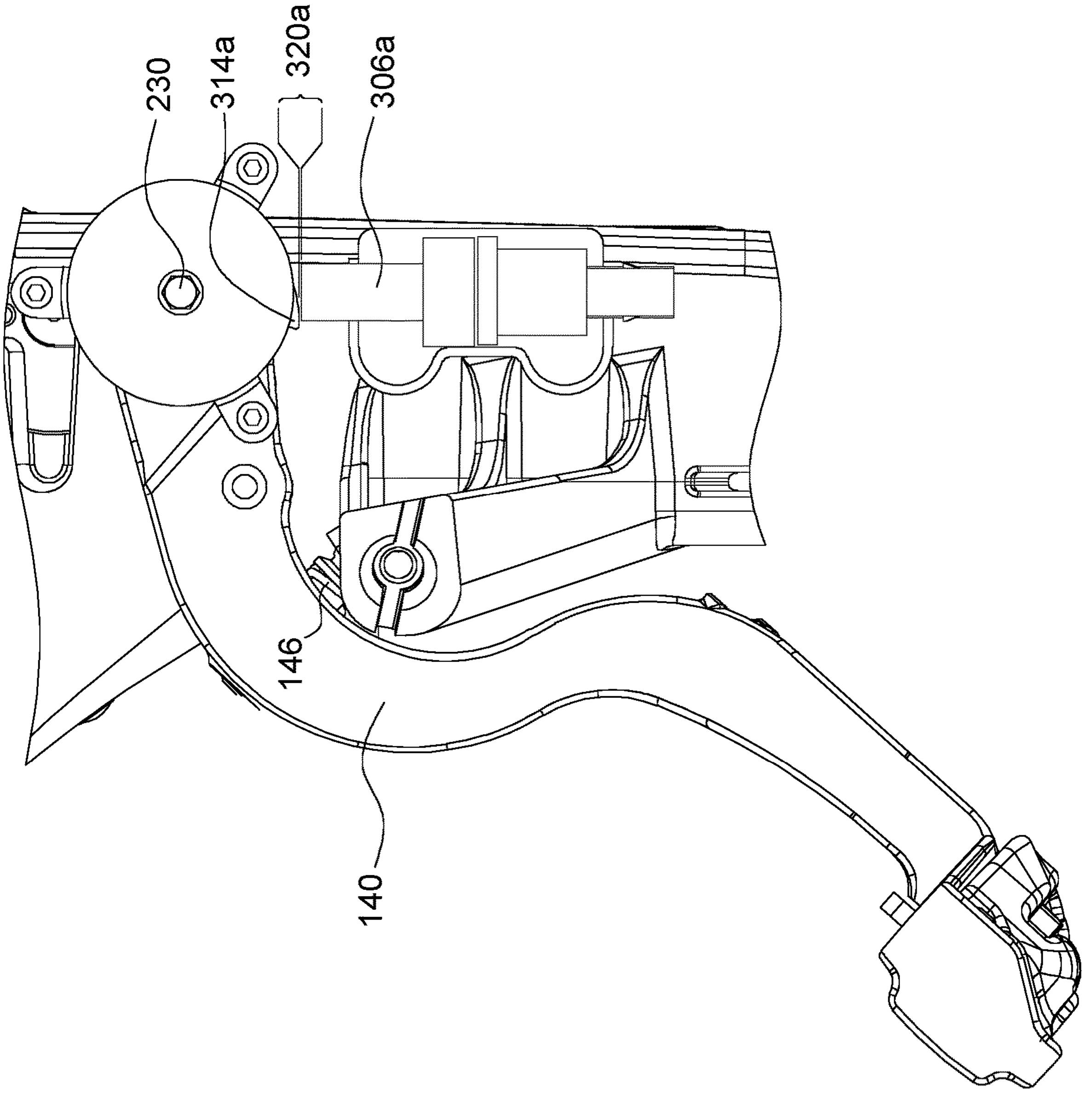
FIG. 24B is a side view of the embodiment represented in FIG. 22, with the right brake pedal engaged to a second position.

Turning next for illustration to FIGS. 20-21, according to some implementations of a brake pedal feedback system 120 as disclosed herein, the spring driver 150 connects to a ball ramp 210 including a rotating ramp 212, a sliding ramp 214, and a plurality of balls 216. The ball ramp 210 can be positioned on the right side of the right brake pedal 140 or on the left side of the left brake pedal 130. A cover or housing 200 can at least partially surround or enclose the ball ramp 210. The housing 200 can be fixed to the frame or chassis. The sliding ramp 214 is connected to the housing 200 to prevent rotation of the sliding ramp 214 relative to the housing 200. The sliding ramp 214 can move axially within with housing 200. The spring driver 150 can include a shaft 234, which connects to the rotating ramp 212. When the spring driver 150 rotates based upon one or more of the brake pedals 130, 140 being pressed downward in one of the engaged positions, the rotating ramp 212 rotates relative to the sliding ramp 214 causing the sliding ramp 214 to move towards the housing 200. The sliding ramp 214 compresses one or more springs 222, 224 between the sliding ramp 214 and the housing 200, which compresses one or more of the springs 222, 224 from a relaxed condition to an energy storing condition. When compressed, one or more of the springs 222, 224 exert a force to return the spring driver 150 and the one or more engaged brake pedal 130, 140 to the disengaged position. When the one or more engaged brake pedals 130, 140 are released, the springs 222, 224 move the sliding ramp 214 back towards the rotating ramp 212 and the spring driver 150 back to the disengaged position. The left and right return springs 136, 146 maintain the left and right brake pedals 130, 140 in the disengaged position.

The stiffness or spring constant of the spring 222 can be the same as, greater than, or less than the stiffness or spring constant of the spring 224. The spring constants of the springs 222, 224 can be selected to provide the desired feedback as at least one of the brake pedals 130, 140 is pressed downward in one of the engaged positions. The springs 222, 224 can have a constant or variable stiffness. The springs 222, 224 can be disc springs.

Exemplary brake pedal position sensing systems 300 as described above are illustrated in combination with different embodiments of a brake pedal feedback system 120 to define exemplary brake pedal position sensing and feedback systems 120, 300. For example, an embodiment of a brake pedal position sensing system 300 is illustrated in FIGS. 8 to 10B in the context of brake pedal feedback systems 120 as previously illustrated in FIGS. 2-7, a brake pedal position sensing system 300 is illustrated in FIGS. 17 to 19B in the context of brake pedal feedback systems 120 as previously illustrated in 13 to 16B, and a brake pedal position sensing system 300 is illustrated in FIGS. 22 to 24B in the context of brake pedal feedback systems 120 as previously illustrated in FIGS. 20 and 21. However, it should be noted that brake pedal position sensing systems 300 may in various alternative embodiments be implemented in the absence of the feedback components of a brake pedal feedback system 120 described elsewhere herein, and brake pedal feedback systems 120 may in various alternative embodiments be implemented in the absence of the position sensing components of a brake pedal position sensing system 300 described elsewhere herein, and the illustrations are in no way limiting on the scope of an invention as disclosed unless explicitly noted otherwise.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A non-contact brake pedal position sensing and feedback system comprising:

a first brake pedal unit and a second brake pedal unit configured for angular displacement about a rotation axis at respective first ends thereof, responsive to manual engagement at respective second ends thereof;

a spring driver positioned between the first and second brake pedal units and configured to rotate about the rotation axis upon interacting with the first and second brake pedal units, the spring driver comprising a first recess and a second recess;

the first brake pedal unit comprising a first extension extending in parallel with the rotation axis and at least partially positioned within the first recess, and the second brake pedal unit comprising a second extension extending in parallel with the rotation axis and at least partially positioned within the second recess, wherein manual engagement of the first and/or second brake pedal unit causes the respective first and/or second extension to contact a surface of the respective first and/or second recess, and wherein the spring driver is configured responsive to the manual engagement to bias the respective first and/or second brake pedal unit from an engaged position to a disengaged position;

a respective sensor cam located at the first end of each brake pedal unit and configured for angular displacement along therewith;

a respective sensor housing for each of the first brake pedal unit and the second brake pedal unit, wherein each respective sensor housing is mounted at a fixed position with respect to the rotation axis; and a respective sensor mounted within each sensor housing and configured to generate output signals corresponding to a sensed air gap between the sensor and the sensor cam, wherein the sensed air gap between the sensor cam and the sensor corresponds to an amount of angular displacement for the respective brake pedal unit.

2. The non-contact brake pedal position sensing system of claim 1, wherein the respective sensor housing is oriented orthogonally with respect to the rotation axis.

3. The non-contact brake pedal position sensing system of claim 2, wherein each respective sensor housing is cylindrical in shape.

4. The non-contact brake pedal position sensing system of claim 3, wherein a longitudinal axis of each respective sensor housing is arranged substantially orthogonal to the rotation axis.

5. The non-contact brake pedal position sensing system of claim 1, further comprising for each of the first brake pedal unit and the second brake pedal unit a magnet coupled to the respective sensor cam, wherein the respective sensor is configured to detect variations in a magnetic field produced by the magnet with manual engagement of the respective brake pedal unit.

6. The non-contact brake pedal position sensing system of claim 1, wherein the sensor comprises a back-biased Hall effect sensor.

7. The non-contact brake pedal position sensing system of claim 1, further comprising:

a controller functionally linked to receive the output signals from each respective sensor, and further configured to generate braking command signals to a braking unit based on the received output signals.

8. The non-contact brake pedal position sensing system of claim 1, further comprising:

a display unit configured to display information corresponding to an amount of angular displacement for the respective brake pedal unit, based on the output signals from the sensor.

9. The non-contact brake pedal sensing system of claim 1, wherein:

manual engagement of the first and/or second brake pedal unit causes the respective first and/or second extension to contact a first surface of the respective first and/or second recess;

the spring driver comprises, for each of the first and second recesses, a second surface opposite the first surface;

wherein, for each of the first and second recesses, a distance between the second surface and the extension for the respective brake pedal when the brake pedal is in the disengaged position is such that a complete engagement of one of the brake pedals, and angular displacement of the spring driver, does not cause the respective extension for the other of the brake pedals to engage the associated second surface.

10. A work vehicle comprising:

a frame supported by one or more ground engaging apparatus;

one or more power sources configured to drive an advance speed for the work vehicle, responsive at least in part to control signals from a braking unit;

a first brake pedal unit and a second brake pedal unit configured for angular displacement about a rotation axis at respective first ends thereof, responsive to manual engagement at respective second ends thereof;

a spring driver positioned between the first and second brake pedal units and configured to rotate about the rotation axis upon interacting with the first and second brake pedal units, the spring driver comprising a first recess and a second recess;

the first brake pedal unit comprising a first extension extending in parallel with the rotation axis and at least partially positioned within the first recess, and the second brake pedal unit comprising a second extension extending in parallel with the rotation axis and at least partially positioned within the second recess, wherein manual engagement of the first and/or second brake pedal unit causes the respective first and/or second extension to contact a surface of the respective first and/or second recess, and wherein the spring driver is configured responsive to the manual engagement to bias the respective first and/or second brake pedal unit from an engaged position to a disengaged position; and a non-contact brake pedal position sensing system comprising, for each of the first brake pedal unit and the second brake pedal unit:

a sensor cam located at the first end of the respective brake pedal unit and configured for angular displacement along therewith;

a respective sensor housing for each of the first brake pedal unit and the second brake pedal unit, wherein each respective sensor housing is mounted at a fixed position with respect to the rotation axis; and a sensor mounted within each respective sensor housing and configured to generate output signals corresponding to a sensed air gap between the sensor and the sensor cam, wherein the sensed air gap between the sensor cam and the sensor corresponds to an amount of angular displacement for the respective brake pedal unit.

11. The work vehicle of claim 10, wherein the respective sensor housing is oriented orthogonally with respect to the rotation axis.

12. The work vehicle of claim 11, wherein each respective sensor housing is cylindrical in shape.

13. The work vehicle of claim 12, wherein a longitudinal axis of each respective sensor housing is arranged substantially orthogonal to the rotation axis.

14. The work vehicle of claim 10, the brake pedal position sensing system further comprising for each of the first brake pedal unit and the second brake pedal unit a magnet coupled to the respective sensor cam, wherein the respective sensor is configured to detect variations in a magnetic field produced by the magnet with manual engagement of the respective brake pedal unit.

15. The work vehicle of claim 10, wherein the sensor comprises a back-biased Hall effect sensor.

16. The work vehicle of claim 10, the brake pedal position sensing system further comprising:

a controller functionally linked to receive the output signals from each respective sensor, and further configured to generate braking command signals to a braking unit based on the received output signals.

17. The work vehicle of claim 10, further comprising:

a display unit configured to display information corresponding to an amount of angular displacement for the respective brake pedal unit, based on the output signals from the sensor.

18. The work vehicle of claim 10, wherein:

manual engagement of the first and/or second brake pedal unit causes the respective first and/or second extension to contact a first surface of the respective first and/or second recess;

the spring driver comprises, for each of the first and second recesses, a second surface opposite the first surface;

wherein, for each of the first and second recesses, a distance between the second surface and the extension for the respective brake pedal when the brake pedal is in the disengaged position is such that a complete engagement of one of the brake pedals, and angular displacement of the spring driver, does not cause the respective extension for the other of the brake pedals to engage the associated second surface.

* * * * *